(12) United States Patent
Kumar et al.

(10) Patent No.: US 10,884,430 B2
(45) Date of Patent: Jan. 5, 2021

(54) SYSTEMS AND METHODS FOR GENERATING SAFE TRAJECTORIES FOR MULTI-VEHICLE TEAMS

(71) Applicant: The Trustees of the University of Pennsylvania, Philadelphia, PA (US)

(72) Inventors: R. Vijay Kumar, Wilmington, DE (US); Sarah Yifang Tang, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 195 days.

(21) Appl. No.: 15/759,292

(22) PCT Filed: Sep. 12, 2016

(86) PCT No.: PCT/US2016/051313
§ 371 (c)(1),
(2) Date: Mar. 12, 2018

(87) PCT Pub. No.: WO2017/095493
PCT Pub. Date: Jun. 8, 2017

(65) Prior Publication Data
US 2019/0072980 A1 Mar. 7, 2019

Related U.S. Application Data

(60) Provisional application No. 62/217,301, filed on Sep. 11, 2015.

(51) Int. Cl.
*G05D 1/02* (2020.01)
*G08G 1/16* (2006.01)
(Continued)

(52) U.S. Cl.
CPC ......... *G05D 1/0289* (2013.01); *G05D 1/0214* (2013.01); *G05D 1/104* (2013.01);
(Continued)

(58) Field of Classification Search
CPC .... G05D 1/0289; G05D 1/0214; G05D 1/104; G08G 1/164; G08G 1/166; G08G 5/045
See application file for complete search history.

(56) References Cited

U.S. PATENT DOCUMENTS 5,414,631 A  5/1995  Denoize et al.
6,278,945 B1  8/2001  Lin
(Continued)

FOREIGN PATENT DOCUMENTS

AU  2013293507 B2  3/2017
CA  2931632  7/2020
(Continued)

OTHER PUBLICATIONS

Non-Final Office Action for U.S. Appl. No. 15/684,700 (dated Aug. 22, 2019).
(Continued)

*Primary Examiner* — Marthe Y Marc-Coleman
(74) *Attorney, Agent, or Firm* — Jenkins, Wilson, Taylor & Hunt, P.A.

(57) ABSTRACT

The present subject matter relates to systems and methods for generating trajectories for a plurality of vehicles in a multi-vehicle system. An optimal motion plan is determined for moving each of the plurality of vehicles between a respective starting position and an assigned goal position, possible collisions are identified among the optimal motion plans of the plurality of vehicles, and, for a subset of the plurality of vehicles identified as being associated with a possible collision, the optimal motion plan of each vehicle in the subset is modified to define modified trajectories that each include a common circular holding pattern such that the possible collision is avoided.

21 Claims, 9 Drawing Sheets

(51) Int. Cl.
*G08G 5/04* (2006.01)
*G05D 1/10* (2006.01)

(52) U.S. Cl.
CPC ............ *G08G 1/164* (2013.01); *G08G 1/166* (2013.01); *G08G 5/045* (2013.01)

(56) References Cited

U.S. PATENT DOCUMENTS

| | | |
|---|---|---|
| 6,308,911 B1 | 10/2001 | Schroeder |
| 6,422,508 B1 | 7/2002 | Barnes |
| 7,249,730 B1 | 7/2007 | Flippen, Jr. |
| 7,289,906 B2 | 10/2007 | van der Merwe et al. |
| 8,019,544 B2 | 9/2011 | Needelman et al. |
| 8,082,074 B2 * | 12/2011 | Duggan ............... G05D 1/0061 244/75.1 |
| 8,380,362 B2 | 2/2013 | Beavin |
| 8,577,539 B1 | 11/2013 | Morrison et al. |
| 8,676,498 B2 | 3/2014 | Ma et al. |
| 8,756,001 B2 | 6/2014 | Georgy et al. |
| 8,768,555 B2 * | 7/2014 | Duggan ............... G05D 1/0061 244/75.1 |
| 9,031,809 B1 | 5/2015 | Kumar et al. |
| 9,104,201 B1 | 8/2015 | Pillai et al. |
| 9,129,355 B1 | 9/2015 | Harvey et al. |
| 9,243,916 B2 | 1/2016 | Roumeliotis et al. |
| 9,265,187 B2 | 2/2016 | Cavender-Bares et al. |
| 9,488,480 B2 | 11/2016 | Georgy et al. |
| 9,568,321 B2 | 2/2017 | Bharadwaj et al. |
| 9,599,993 B2 | 3/2017 | Kumar et al. |
| 9,607,401 B2 | 3/2017 | Roumeliotis et al. |
| 10,037,028 B2 | 7/2018 | Loianno et al. |
| 10,395,115 B2 | 8/2019 | Kumar et al. |
| 10,732,647 B2 | 8/2020 | Shen |
| 2003/0182077 A1 | 9/2003 | Emord |
| 2004/0264761 A1 | 12/2004 | Mas et al. |
| 2005/0251328 A1 | 11/2005 | Merwe et al. |
| 2006/0015247 A1 | 1/2006 | Speer |
| 2007/0032951 A1 | 2/2007 | Tanenhaus et al. |
| 2007/0235592 A1 | 10/2007 | Horn et al. |
| 2008/0125896 A1 | 5/2008 | Troy et al. |
| 2008/0144925 A1 | 6/2008 | Zhu et al. |
| 2008/0195316 A1 | 8/2008 | Krishnaswamy |
| 2009/0248304 A1 | 10/2009 | Roumeliotis et al. |
| 2009/0256909 A1 | 10/2009 | Nixon |
| 2009/0290811 A1 | 11/2009 | Imai |
| 2010/0066073 A1 | 3/2010 | Jensen et al. |
| 2010/0084513 A1 | 4/2010 | Gariepy et al. |
| 2010/0114408 A1 | 5/2010 | Goossen |
| 2011/0029235 A1 | 2/2011 | Berry |
| 2011/0029255 A1 * | 2/2011 | Hyde ................ A47G 19/2227 702/25 |
| 2011/0082566 A1 | 4/2011 | Herr et al. |
| 2012/0078510 A1 | 3/2012 | Ma et al. |
| 2012/0101861 A1 | 4/2012 | Lindores |
| 2012/0203519 A1 | 8/2012 | Louis et al. |
| 2012/0221244 A1 | 8/2012 | Georgy et al. |
| 2012/0245844 A1 | 9/2012 | Lommel et al. |
| 2012/0256730 A1 | 10/2012 | Scott et al. |
| 2012/0286991 A1 | 11/2012 | Chen et al. |
| 2013/0124020 A1 | 5/2013 | Duggan et al. |
| 2013/0131908 A1 | 5/2013 | Trepagnier et al. |
| 2013/0176423 A1 | 7/2013 | Rischmuller et al. |
| 2013/0325346 A1 | 12/2013 | McPeek |
| 2014/0008496 A1 | 1/2014 | Ye et al. |
| 2014/0032167 A1 | 1/2014 | Mayer et al. |
| 2014/0099853 A1 | 4/2014 | Condon et al. |
| 2014/0119716 A1 | 5/2014 | Ohtomo et al. |
| 2014/0138477 A1 | 5/2014 | Keennon et al. |
| 2014/0152839 A1 | 6/2014 | Menon |
| 2014/0263822 A1 | 9/2014 | Malveaux |
| 2014/0277847 A1 | 9/2014 | Cann et al. |
| 2014/0278029 A1 | 9/2014 | Tonguz et al. |
| 2014/0312165 A1 | 10/2014 | Mkrtchyan |
| 2014/0324253 A1 | 10/2014 | Duggan et al. |
| 2014/0368663 A1 | 12/2014 | Pandey et al. |
| 2014/0372026 A1 | 12/2014 | Georgy et al. |
| 2015/0025713 A1 | 1/2015 | Klinger et al. |
| 2015/0039220 A1 | 2/2015 | Georgy et al. |
| 2015/0149000 A1 | 5/2015 | Rischmuller et al. |
| 2015/0304634 A1 | 10/2015 | Karvounis |
| 2015/0321758 A1 | 11/2015 | Sarna, II |
| 2015/0332489 A1 | 11/2015 | Birchfield et al. |
| 2016/0050840 A1 | 2/2016 | Sauder et al. |
| 2016/0071278 A1 | 3/2016 | Leonard et al. |
| 2016/0132052 A1 | 5/2016 | Seydoux et al. |
| 2016/0139596 A1 | 5/2016 | Na et al. |
| 2016/0200438 A1 | 7/2016 | Bokeno et al. |
| 2016/0209236 A1 | 7/2016 | Steinhardt |
| 2016/0214713 A1 | 7/2016 | Cragg |
| 2016/0214715 A1 | 7/2016 | Meffert |
| 2016/0216119 A1 | 7/2016 | Omr et al. |
| 2017/0023937 A1 | 1/2017 | Loianno et al. |
| 2017/0212529 A1 | 7/2017 | Kumar et al. |
| 2017/0372137 A1 | 12/2017 | Kumar et al. |
| 2018/0088597 A1 | 3/2018 | Shen |

FOREIGN PATENT DOCUMENTS

| | | |
|---|---|---|
| CN | 101109640 A | 1/2008 |
| CN | 101655561 A | 2/2010 |
| CN | 101676744 A | 3/2010 |
| CN | 104718508 B | 9/2017 |
| EP | 3 470 787 A1 | 4/2019 |
| EP | 2 845 071 B1 | 3/2020 |
| EP | 3 470 787 B1 | 4/2020 |
| HK | 1210288 | 8/2018 |
| WO | WO 2014/018147 A2 | 1/2014 |
| WO | WO 2015/105597 A2 | 7/2015 |
| WO | WO 2016/123201 A1 | 8/2016 |
| WO | WO 2017/095493 A2 | 6/2017 |

OTHER PUBLICATIONS

Office Action for Japanese Patent Application U.S. Appl. No. 2018-075247 (dated Jul. 2, 2019).

Advisory Action and AFCP 2.0 Decision for U.S. Appl. No. 15/684,700 (dated Jul. 2, 2019).

Notice of Allowance and Fee(s) Due for U.S. Appl. No. 15/545,266 (dated Apr. 12, 2019).

Final Office Action for U.S. Appl. No. 15/684,700 (dated Mar. 19, 2019).

Communication of the extended European search report for European Patent Application Serial No. 182107805 (dated Jan. 30, 2019).

Non-Final Ofice Action for U.S. Appl. No. 15/545,266 (dated Oct. 5, 2018).

Communication under Rule 71(3) EPC Intention to Grant for European Patent Application Serial No. 14 878 289.9(dated Sep. 19, 2018).

Notification of the First Office Action for Chinese Patent Application Serial No. 201480064737.8 (dated Sep. 5, 2018).

Communication pursuant to Article 94(3) EPC for European Patent Application Serial No. 13 823 648.4 (dated Jul. 17, 2018).

Non-Final Office Action for U.S. Appl. No. 15/684,700 (dated Jul. 12, 2018).

Supplemental Notice of Allowability for U.S. Appl. No. 15/218,938 (dated Jul. 5, 2018).

Shen et al., "Vision-Based State Estimation and Trajectory Control Towards High-Speed Flight with a Quadrotor," Robotics: Science and Systems 2013, pp. 1-8 (Jun. 24-28, 2013).

Huh et al., "Integrated Navigation System using Camera and Gimbaled Laser Scanner for Indoor and Outdoor Autonomous Flight of UAVs," In Proc. of the IEEE/RSJ Int. Conference on Intelligent Robots and Systems (IROS), pp. 3158-3163 (Nov. 3-7, 2013).

Schmid et al., "State Estimation for highly dynamic flying Systems using Key Frame Odometry with varying Time Delays," IROS, pp. 2997-3004 (Oct. 7-12, 2012).

Notification of Transmittal of the International Search Report and the Written Opinion of the International Searching Authority, or the Declaration for International Application No. PCT/US16/51313 (dated May 19, 2017).

(56) References Cited

OTHER PUBLICATIONS

Notice of Allowance and Fees Due for U.S. Appl. No. 15/218,938 (dated Mar. 26, 2018).
Advisory Action and AFCP 2.0 Decision for U.S. Appl. No. 15/218,938 (dated Feb. 1, 2018).
Applicant-Initiated Interview Summary for U.S. Appl. No. 15/218,938 (dated Nov. 3, 2017).
Final Office Action for U.S. Appl. No. 15/218,938 (dated Oct. 19, 2017).
Non-Final Office Action for U.S. Appl. No. 15/218,938 (dated Jun. 21, 2017).
Letter Regarding Decision to Grant for Chinese Application No. 201380034947.8 (dated Jun. 2, 2017).
Advisory Action and AFCP 2.0 Decision for U.S. Appl. No. 15/218,938 (dated Apr. 14, 2017).
Non-Final Office Action for U.S. Appl. No. 15/165,846 (dated Feb. 23, 2017).
Final Office Action for U.S. Appl. No. 15/218,938 (dated Feb. 3, 2017).
Letter regarding the second Office Action for Chinese Patent Application No. 201380034947.8 (dated Jan. 26, 2017).
Notice of Acceptance for Australian Patent Application No. 2013293507 (dated Nov. 30, 2016).
Notice of Allowance and Fee(s) Due for U.S. Appl. No. 14/397,761 (dated Oct. 4, 2016).
Non-Final Office Action for U.S. Appl. No. 15/218,938 (dated Sep. 29, 2016).
Communication of European publication number and information on the application of Article 67(3) EPC for European Patent Application No. 14878289.9 (dated Sep. 7, 2016).
Notification of First Office Action for Chinese Patent Application No. 201380034947.8 (dated Jun. 3, 2016).
European Search Report and Opinion for EP Application No. 13 823 648.4 (dated May 23, 2016).
Notification of Transmittal of the International Search Report and the Written Opinion of the International Searching Authority, or the Declaration for International Application No. PCT/US2016/015093 (dated May 19, 2016).
Non-Final Office Action for U.S. Appl. No. 14/397,761 (dated Mar. 28, 2016).
Official Office Action for Australian Application No. 2013293507 (dated Feb. 4, 2016).
Commonly assigned, co-pending PCT International Patent Application No. PCT/US2016/015093 titled, "Systems, Devices, and Methods for Robotic Remote Sensing for Precision Agriculture," (unpublished, filed Jan. 27, 2016).
Wagner et al., "Subdimensional expansion for multirobot path planning," Artificial Intelligence, vol. 219, pp. 1-24, (2015).
Commonly assigned, co-pending U.S. Appl. No. 62/217,301 titled, "Systems and Methods for Generating Safe Trajectories for Multi-Vehicle Teams," (unpublished, filed Sep. 11, 2015).
Loianno et al., "Smartphones power flying robots,"IEEE/RSJ International Conference on Intelligent Robots and Systems Hamburg, Germany, pp. 1256-1263 (Sep. 2015).
Notification of Transmittal of the International Search Report and the Written Opinion of the International Searching Authority, or the Declaration for International Application No. PCT/US2014/067822 (dated Aug. 7, 2015).
Kamra et al., "Dynamic resource reallocation for robots on long term deployments," IEEE International Conference on Automation Science and Engineering, Gothenburg, Sweden, pp. 612-617 (Aug. 2015).
Commonly assigned, co-pending U.S. Appl. No. 62/196,762 titled, "Systems, Devices, and Methods for On-Board Sensing and Control of Micro Aerial Vehicles," (unpublished, filed Jul. 24, 2015).
Loianno et al., "Cooperative localization and mapping of MAVs using RGB-D sensors," IEEE International Conference on Robotics and Automation, pp. 4021-4028 (May 2015).
Communication of European publication number and information on the application of Article 67 (3) EPC for Application No. 13823648.4 (dated Feb. 11, 2015).
Shen et al., "Tightly-coupled monocular visual-inertial fusion for autonomous flight of rotorcraft MAVs," IEEE Intl. Conf. on Robot. and Autom., Seattle, Washington, USA (2015).
Loianno et al., "Automating navigation of micro UAVs using smart phones," IEEE Robotics and Automation Magazine (2015).
Goldenberg et al., Enhanced partial expansion A*, Journal of Artificial Intelligence Research, vol. 50, No. 1, pp. 141-187 (2014).
Notification of Transmittal of the International Search Report and the Written Opinion of the International Searching Authority, or the Declaration for International Application No. PCT/US2013/038769 (dated Jan. 17, 2014).
Hesch et al., "Camera-imu-based localization: Observability analysis and consistency improvement," The Intl. Journal of Robotics Research, vol. 33, No. 1, pp. 182-201 (2014).
Thomas et al., "Toward Image Based Visual Servoing for Aerial Grasping and Perching," IEEE Intl. Conf. on Robot. and Autom., Hong Kong, China, pp. 2113-2118 (2014).
Specht E., "The best known packings of equal circles in a square," http://hydra.nat.uni-magdeburg.de/packing/csq/csq.html (Oct. 2013).
Yu et al., "Planning optimal paths for multiple robots on graphs," in Proceedings of 2014 IEEE International Conference on Robotics and Automation (ICRA), pp. 3612-3617, (2013).
Martinelli, "Visual-inertial structure from motion: Observability and resolvability," IEEE/RSJ Intl. Conf. on Intell. Robots and Systems (IROS 2013), pp. 4235-4242 (Nov. 2013).
Schmid et al., "Stereo vision based indoor/outdoor navigation for flying robots," Proc. of the IEEE/RSJ Intl. Cozzi: on Intell. Robots and Syst., Tokyo, Japan, pp. 1-8 (Nov. 2013).
Lynen et al., "A robust and modular multi-sensor fusion approach applied to MAV navigation," Proc. of the IEEE/RSJ/ Intl. Conf. on. Intell. Robots and Syst., Tokyo, Japan, pp. 1-7 (Nov. 2013).
"Kalman filter," Wikipedia, pp. 1-31 http://en.wikipedia.org/wiki/Kalman_filter (page last modified May 24, 2016)
Richter et al., "Polynomial trajectory planning for quadrotor flight," Proc. of the IEEE Intl. Conf on Robot. and Autom., Karlsruhe, Germany, pp. 1-8 (May 2013).
Shen et al., "Vision-based state estimation and trajectory control towards high-speed flight with a quadrotor," Proc. of Robot.: Sci. and Syst., Berlin, Germany, pp. 1-8 (May 2013).
Shen et al., "Vision-based state estimation for autonomous rotorcraft MAVs in complex environments," Proc. of the IEEE Intl. Conf. on Robot. And Autom., Karlsruhe, Germany, pp. 1-7 (May 2013).
Li et al., "Real-time motion tracking on a cellphone using inertial sensing and a rolling-shutter camera," IEEE International Conference on Robotics and Automation, pp. 4712-4719 (May 2013).
Lee et al., "Nonlinear Robust Tracking Control of a Quadrotor UAV on SE(3)," Asian Journal of Control, vol. 15, No. 2, pp. 391-408 (May 2013).
Zou et al., "CoSLAM: Collaborative visual SLAM in dynamic environments," IEEE Transactions on Pattern Analysis Machine Intelligence, vol. 35, No. 2, pp. 354-366 (2013).
De Wilde et al,. "Push and Rotate: Cooperative Multi-Agent Path Planning," Proceedings of the 2013 International Conference on Autonomous Agents and Multi-agent Systems (AAMAS), p. 87-94 (2013).
Forster et al., "Collaborative monocular SLAM with multiple Micro Aerial Vehicles," IEEE/RSJ Conference on Intelligent Robots and System, Tokyo, Japan (2013).
Turpin et al., "CAPT: Concurrent assignment and planning of trajectories for multiple robots," The International Journal of Robotics Research 2014, vol. 33(1) p. 98-112 (2013).
Turpin et al., "Trajectory Design and Control for Aggressive Formation Flight with Quadrotors," Autonomous Robots, vol. 33, pp. 143-156 (Feb. 10, 2012).
Ozaslan et al., "Inspection of Penstocks and Featureless Tunnel-like Environments using Micro UAVs," Field and Service Robotics Conference (FSR), Brisbane, Australia, pp. 123-136 (2013).

(56) References Cited

OTHER PUBLICATIONS

Schmid et al., "Towards autonomous MAV exploration in cluttered indoor and outdoor environments," RSS 2013 Workshop on Resource-Eficient Integration of Perception, Control and Navigation for Micro Air Vehicles (MAVS), Berlin, Germany (2013).
Sucan et al., "The Open Motion Planning Library," IEEE Robot. Autom. Mag., vol. 19, No. 4, pp. 72-82 http://ompl.kavrakilab.org (Dec. 2012).
Shen et al., "State Estimation for Indoor and Outdoor Operation with a Micro-Aerial Vehicle," International Symposium on Experimental Robotics (ISER), pp. 1-15 (2012).
Fraundorfer et al., "Vision-based autonomous mapping and exploration using a quadrotor MAV," Proc. of the IEEE/RSJ Intl. Conf on bztell. Robots and Syst., Vilamoura, Algarve, Portugal, pp. 1-8 (Oct. 2012).
Ayanian et al., "Decentralized multirobot control in partially known environments with dynamic task reassignment," IFAC Workshop on Distributed Estimation and Control in Networked Systems, Santa Barbara, CA, p. 311-316 (Sep. 2012).
Scherer et al., "River mapping from a flying robot: state estimation, river detection, and obstacle mapping," Auton. Robots, vol. 33, No. 1-2, pp. 189-214 (Aug. 2012).
Kushleyev et al., "Towards a swarm of agile micro quadrotors," Robotics: Science and Systems VIII, University of Sydney, NSW, Australia, pp. 28-35 (Jul. 9-13, 2012).
Kottas et al., "On the consistency of vision-aided inertial navigation," Proc. of the Intl. Sym. on Exp. Robot., Quebec, Canada, pp. 1-15 (Jun. 2012).
Weiss et al., "Real-time onboard visual-inertial state estimation and self-calibration of mays in unknown environments," Proc. of the IEEE Intl. Conf on Robot. and Autom., Saint Paul, MN, pp. 957-964 (May 2012).
De Croon et al., "Sub-sampling: Real-time vision for micro air vehicles," Robot. and Autom. Syst., vol. 60, No. 2, pp. 167-181 (Feb. 2012).
Turpin et al., "Trajectory design and control for aggressive formation flight with quadrotors," Autonomous Robots, vol. 33, pp. 143-156 (Feb. 2012).
Forte et al., "Impedance Control of an Aerial Manipulator," American Control Conference (ACC), Montreal, Canada, pp. 3839-3844 (2012).
Michael et al., "Collaborative mapping of an earthquake-damaged building via ground and aerial robots," Journal of Field Robotics, vol. 29, No. 5, pp. 832-841 (2012).
Shen et al., "Autonomous indoor 3D exploration with a Micro-Aerial Vehicle," IEEE Intl. Conf. on Robot. and Autom., St. Paul, Minnesota, USA, pp. 9-15 (2012).
Tomic et al., "Toward a Fully Autonomous UAV: Research platform for indoor and outdoor urban search and rescue," IEEE Robot. Autom. Mag., vol. 19, No. 3, pp. 46-56 (2012).
Kushleyev et al., "Planning for landing site selection in the aerial supply delivery," Proc. of the IEEE/RSJ Intl. Conf on Intell. Robots and Syst., San Francisco, CA, pp. 1146-1153 (Sep. 2011).
Michael et al., "Control of ensembles of aerial robots," Proc. of the IEEE, vol. 99, No. 9, pp. 1587-1602 (Sep. 2011).
Huang et al., "Visual odometry and mapping for autonomous flight using an RGB-D camera," Proc. of the Intl. Spit. of Robot. Research, Flagstaff, AZ, pp. 1-16 (Aug. 2011).
Bills et al., "Autonomous MAV flight in indoor environments using single image perspective cues," Proc. of the IEEE Intl. Conf. on Robot, and Autom., Shanghai, China, pp. 5776-5783 (May 2011).
Mellinger et al., "Minimum Snap Trajectory Generation and Control for Quadrotors," IEEE International Conference on Robotics and Automation, pp. 2520-2525 (May 2011).
Kuemmerle et al., "g2o: A general framework for graph optimization," Proc. of the IEEE Intl. Conf. on Robot. and Autom., Shanghai, China, pp. 3607-3513 (May 2011).
Shen et al., "Autonomous multi-floor indoor navigation with a computationally constrained MAV," Proc. of the IEEE Intl. Conf on Robot. and Autom., Shanghai, China, pp. 20-25 (May 2011).

De Vries et al., "Cooperative Control of Swarms of Unmanned Aerial Vehicles," 49th AIAA Aerospace Sciences Meeting including the New Horizons Forum and Aerospace Exposition, pp. 1-23 (Jan. 2011).
Jones et al., "Visual-inertial navigation, mapping and localization: A scalable real-time causal approach," International Journal of Robotics Research, pp. 1-38 (Jan. 2011).
Michael et al., "Cooperative manipulation and transportation with aerial robots," Auton. Robots, vol. 30, No. 1, pp. 73-86 (Jan. 2011).
Grzonka et al., "A fully autonomous indoor quadrotor," IEEE Trans. Robot., vol. PP, No. 99, pp. 1-11 (2011).
Bachrach et al., "RANGE-robust autonomous navigation in GPS-denied environments," J. Field Robotics, vol. 28, No. 5, pp. 644-666 (2011).
Weiss et al., "Monocular-SLAM-based navigation for autonomous micro helicopters in GPS denied environments." Journal of Field Robotics, vol. 28, No. 6, pp. 854-874 (2011).
Lee et al., "Geometric tracking control of a quadrotor UAV on SE(3)," Proc. of the Intl. Conf. on Decision and Control, Atlanta, GA, pp. 5420-5425 (Dec. 2010).
Mellinger et al., "Trajectory generation and control for precise aggressive maneuvers," Intl. Symposium on Experimental Robotics (Dec. 2010).
Alonso-Mora et al., "Optimal reciprocal collision avoidance for multiple non-holonomic robots," Proceedings of the 10th International Symposium on Distributed Autonomous Robotic Systems (DARS), Berlin, Springer Press (Nov. 2010).
Mellinger et al., "Cooperative grasping and transport using multiple quadrotors," Intl. Symposium on Distributed Autonomous Systems, Lausanne, Switzerland (Nov. 2010).
Michael et al., "The Grasp Multiple Micro UAV Test Bed," IEEE Robotics and Automation Magazine, vol. 17, No. 3, pp. 56-65 (Sep. 2010).
Kelly et al., "Visual-inertial sensor fusion: Localization, mapping and sensor-to-sensor self-calibration," pp. 1-53 (Aug. 2010).
Carlson, "Mapping large urban environments with GPS-aided SLAM," Ph.D. dissertation, CMU, Pittsburgh, PA, pp. 1-122 (Jul. 2010).
Mei et al., "RSLAM: A system for large-scale mapping in constant-time using stereo," Intl J. of Computer Vision, pp. 1-17 (Jun. 2010).
Strasdat et al., "Scale drift-aware large scale monocular SLAM," Proc. of Robot.: Sci. and Syst., Zaragoza, Spain, pp. 1-8 (Jun. 2010).
Karaman et al., "Incremental sampling-based algorithms for optimal motion planning," Proc. of Robot.: Sci. and Syst., Zaragoza, Spain pp. 1-8 (Jun. 2010).
Gillula et al., "Design of guaranteed safe maneuvers using reachable sets: Autonomous quadrotor aerobatics in theory and practice," Proc. of the IEEE Intl. Conf. on Robotics and Automation, pp. 1649-1654, Anchorage, AK (May 2010).
Lupashin et al., "A simple learning strategy for high-speed quadrocopter multi-flips," Proc. of the IEEE Intl. Conf. on Robot. and Autom., pp. 1642-1648, Anchorage, AK (May 2010).
Oung et al., "The distributed flight array," Proc. of the IEEE Intl. Conf. on Robotics and Automation, pp. 601-607, Anchorage, AK (May 2010).
He et al., "On the design and use of a micro air vehicle to track and avoid adversaries," The Internatlonal Journal of Robotlcs Research, vol. 29, pp. 529-546 (2010).
Oh, "Multisensor Fusion for Autonomous UAV Navigation Based on the Unscented Kalman Filter with Sequential Measurement Updates," IEEE International Conference on Multisensor Fusion and Integration for Intelligent Systems, pp. 217-222 (Sep. 2010).
Bachrach et al., "Autonomous flight in unknown indoor environments," International Journal of Micro Air Vehlcles, vol. 1, No. 4, pp. 217-228 (Dec. 2009).
Fink et al., "Planning and control for cooperative manipulation and transportation with aerial robots," Proceedings of the Intl. Symposium of Robotics Research, Luzem, Switzerland (Aug. 2009).
Tedrake, "LQR-Trees: Feedback motion planning on sparse randomized trees," Proceedings of Robotics: Science and Systems, Seattle, WA (Jun. 2009).
Moore et al., "Simultaneous local and global state estimation for robotic navigation," Proc. of the IEEE Intl. Conf. on Robot. and Autom., Kobe, Japan, pp. 3794-3799 (May 2009).

(56) References Cited

OTHER PUBLICATIONS

Schleicher et al., "Real-time hierarchical GPS aided visual SLAM on urban environments," Proc. of the IEEE Intl. Conf. on Robot. and Autom., Kobe, Japan, pp. 4381-4386 (May 2009).
Trawny et al., "Cooperative multi-robot localization under communication constraints," IEEE International Conference on Robotics and Automation, Kobe, Japan, pp. 4394-4400 (May 2009).
Esme, "Kalman Filter for Dummies," Bilgin's Blog, pp. 1-15, http://bilgin.esme.org/BitsBytes/KalmanFilterforDummies.aspx (Mar. 2009).
Bullo et al., Distributed Control of Robotic Networks: A Mathematical Approach to Motion Coordination Algorithms. Applied Mathematics Series, Princeton University Press (2009).
Klein et al., "Parallel Tracking and Mapping on a Camera Phone," International Symposium on Mixed and Augmented Reality (ISMAR), pp. 1-4 (2009).
Van den Berg, "Reciprocal n-body collision avoidance," International Symposium on Robotics Research p. 3-19, (2009).
Van den Berg et al., "Centralized path planning for multiple robots: Optimal decoupling into sequential plans," in Proceedings of Robotics: Science and Systems (RSS), (2009).
Van den Berg J., "RVO2 library documentation," http://gamma.cs.unc.edu/RVO2/documentation/2.0/index.html (2008).
Civera et al., "Inverse depth parameterization for monocular SLAM," IEEE Trans. On Robot., vol. 24, No. 5, pp. 932-945 (Oct. 2008).
Wagner et al., "Robust and Unobtrusive Marker Tracking on Mobile Phones," International Symposium on Mixed and Augmented Reality (ISMAR), pp. 1-7 (Sep. 2008).
Kaess et al., "iSAM: Incremental smoothing and mapping," IEEE Trans. on Robot., manuscript, pp. 1-14 (Sep. 2008).
Kopfstedt et al., "Control of Formations of UAVs for Surveillance and Reconnaissance Missions," Proceedings of the 17th World Congress, The International Federation of Automatic Control, pp. 5161-5166 (Jul. 2008).
Olson, "Robust and efficient robotic mapping," Ph.D. dissertation, MIT, Cambridge, MA, pp. 1-10 (Jun. 2008).
Klein et al., "Parallel tracking and mapping for small AR workspaces," Proc. Sixth IEEE and ACM International Symposium on Mixed and Augmented Reality (ISMAR'07), Nara, Japan, pp. 1-10 (Nov. 2007).
Moreno-Noguer et al., "Accurate non-iterative 0(n) solution to the PnP problem," Proc. of the IEEE Intl. Conf on Computer Vision, Rio de Janeiro, Brazil, pp. 1-8 (Oct. 2007).
Tanner et al., "Flocking in fixed and switching networks," IEEE Trans. Autom. Control, vol. 52, No. 5, pp. 863-868 (May 2007).
Gurdan et al., "Energy-efficient autonomous four-rotor flying robot controlled at 1khz,"Proceedings of the IEEE Intl. Conf. on Robotics and Automation, Roma, Italy (Apr. 2007).
Kloder et al., "Path planning for permutation-invariant multirobot formations," IEEE Transactions on Robotics, vol. 22, No. 4, pp. 650-665 (Aug. 2006).
Rosten et al., "Machine learning for high-speed corner detection," Proc. of the European Conf on Computer Vision, Graz, Austria, pp. 1-14 (May 2006).
Bay et al., "SURF: Speeded up robust features," Proc. of the European Conf on Computer Vision, Graz, Austria, pp. 1-14 (May 2006).
Schouwenaars et al., "Multi-vehicle path planning for non-line of sight communications," American Control Conference (2006).
Peng et al., "Coordinating multiple robots with kinodynamic constraints along specified paths," The International Journal of Robotics Research (IJRR) vol. 24, No. 4, pp. 295-310, (2005).
Hastings et al., "Optimization of large-scale, real-time simulations by spatial hashing," Proceedings of the 2005 Summer Computer Simulation Conference pp. 9-17 (2005).
Kamal et al., "Real Time Trajectory Planning for UAVs Using MILP," Proceedings of the 44th IEEE Conference on Decision and Control, and the European Control Conference 2005, pp. 3381-3386 (Dec. 2005).
Foxlin, "Pedestrian Tracking with Shoe-Mounted Inertial Sensors," Computer Graphics and Applications, vol. 25, No. 6, pp. 38-46 (Nov./Dec. 2005).
Bullo et al., "Geometric Control of Mechanical Systems: Modeling, Analysis, and Design for Simple Mechanical Control Systems," New York Springer Verlag (2005).
Merwe et al., "Sigma-point kalman filters for nonlinear estimation: Applications to integrated navigation," Proc. of AIAA Guidance, Navigation, and Controls Conf., Providence, RI, pp. 1-14 (Aug. 2004).
Van der Merwe et al., "Sigma-Point Kalman Filters for Integrated Navigation," Proc. of AIAA Guidance Navigation, and Controls Conf., pp. 1-14 (Aug. 2004).
Howard et al., "Multi-robot mapping using manifold representations," IEEE International Conference on Robotics and Automation, New Orleans, Louisiana, pp. 4198-4203 (Apr. 2004).
Lowe, "Distinctive image features from scale-invariant keypoints," International Journal of Computer Vision, vol. 60, No. 2, pp. 91-110 (2004).
Schouwenaars et al., "Receding horizon path planning with implicit safety guarantees," American Control Conference, pp. 5576-5581 (2004).
Ansar et al., "Linear pose estimation from points or lines," IEEE Transactions on Pattern Analysis and Machine Intelligence, vol. 25, No. 5, pp. 1-12 (Apr. 2003).
Ma et al., "An Invitation to 3-D Vision: From Images to Geometric Models," SpringerVerlag (2003).
Roumeliotis et al., "Stochastic cloning: A generalized framework for processing relative state measurements," Proc. of the IEEE Intl. Conf on Robot. and Autom., Washington, DC, pp. 1788-1795 (May 2002).
Desai et al., "Modeling and control of formations of nonholonomic mobile robots," IEEE Trans. Robot., vol. 17, No. 6, pp. 905-908 (Dec. 2001).
Egerstedt et al., "Formation constrained multi-agent control," IEEE Trans. Robot. Autom., vol. 17, No. 6, pp. 947-951 (Dec. 2001).
Beard et al., "A coordination architecture for spacecraft formation control," IEEE Trans. Control Syst. Technol., vol. 9, No. 6, pp. 777-790 (Nov. 2001).
Lefebvre et al., "Comment on 'A new method for the nonlinear transformation of means and covariances in filters and estimators'," IEEE Trans. Autom. Control, vol. 47, No. 8, pp. 1-10 (2001).
Richards et al., "Plume avoidance maneuver planning using mixed integer linear programming," AIAA Guidance, Navigation and Control Conference and Exhibit (2001).
Schouwenaars et al., "Mixed integer programming for multi-vehicle path planning," European Control Conference, pp. 2603-2608 (2001).
Welch et al., "An Introduction to the Kalman Filter," SIGGRAPH 2001, Course 8, pp. 1-47 (2001).
Tomlin et al., "Conflict resolution for air traffic management: a study in multi-agent hybrid systems," IEEE Transactions on Automatic Control, vol. 43, pp. 509-521, (1998).
Nieuwstadt et al., "Real-time trajectory generation for differentially flat systems," International Journal of Robust and Nonlinear Control, vol. 8, pp. 995-1020 (1998).
Julier et al., "A new extension of the kalman filter to nonlinear systems," Proc. of SPIE, I. Kadar, Ed., vol. 3068, pp. 182-193 (Jul. 1997).
Parrish et al., Animal Groups in Three Dimensions. Cambridge University Press, New York (1997).
Welch et al., "SCAAT: Incremental Tracking with Incomplete Information," University of North Carolina at Chapel Hill, pp. 1-12 (1997).
Buckley S., "Fast motion planning for multiple moving robots," Proceedings of the 1989 IEEE International Conference on Robotics and Automation (ICRA p. 322-326 (1989).
Smith et al., "Estimating uncertain spatial relationships in robotics," Proc. of the IEEE Intl. Conf. on Robot. and Autom., vol. 4, Raleigh, NC, pp. 167-193 (Mar. 1987).

(56) References Cited

OTHER PUBLICATIONS

Kant et al., "Toward efficient trajectory planning: The path-velocity decomposition," The International Journal of Robotics Research (IJRR), vol. 5, No. 3, pp. 72-89, (1986).

Erdmann et al., "On multiple moving objects," Algorithmica, vol. 2, pp. 1419-1424, (1986).

Lucas et al., "An iterative image registration technique with an application to stereo vision," Proc. of the 7th Intl. Joint Conf. on Artificial Intelligence, Vancouver, Canada, pp. 674-679 (Aug. 1981).

Maybeck, "Chapter 1 Introduction," Stochastic models, estimation, and control, vol. 1, pp. 1-16, Academic Press, Inc. (1979).

Hart et al., "A formal basis for the heuristic determination of minimum cost paths," IEEE Transactions on Systems Science and Cybernetics, vol. 4, No. 2, pp. 100-107, (Jul. 1968).

"Hummingbird quadrotor," Ascending Technologies, http://www.asctec.de/ (publication date unknown; downloaded from the internet May 25, 2016).

"Pelican quadrotor," Ascending Technologies, GmbH, http://www.asctec.de/ (publication date unknown; downloaded from the internet May 25, 2016).

"FAA, "Overview of small uas notice of proposed rulemaking," Feb. 2015."

Kuhn H., "The hungarian method for the assignment problem," Naval Research Logistics Quarterly, vol. 2, No. 1-2, pp. 83-97, 1955.

Forbes, "Meet amazon prime air, a delivery-by-aerial-drone project," Dec. 2013.

Notice of Allowance and Fee(s) Due for U.S. Appl. No. 15/684,700 (dated Mar. 25, 2020).

Decision to grant a European patent pursuant to Article 97(1) EPC for European Patent Application Serial No. 13823648.4 (dated Feb. 20, 2020).

Notice of Allowance for Canadian Patent Application Serial No. 2,931,632 (dated Jan. 21, 2020).

Communication under Rule 71(3) EPC Intention to Grant for European Patent Application Serial No. 18 210 780.5 (dated Nov. 5, 2019).

Communication under Rule 71(3) EPC Intention to Grant for European Patent Application Serial No. 13 823 648.4 (dated Sep. 30, 2019).

Decision to grant a European patent pursuant to Article 97(1) EPC for European Patent Application Serial No. 18210780.5 (dated Mar. 19, 2020).

Notice of Allowance for Japanese Patent Application Serial No. 2018-075247 (dated Jun. 24, 2020).

* cited by examiner

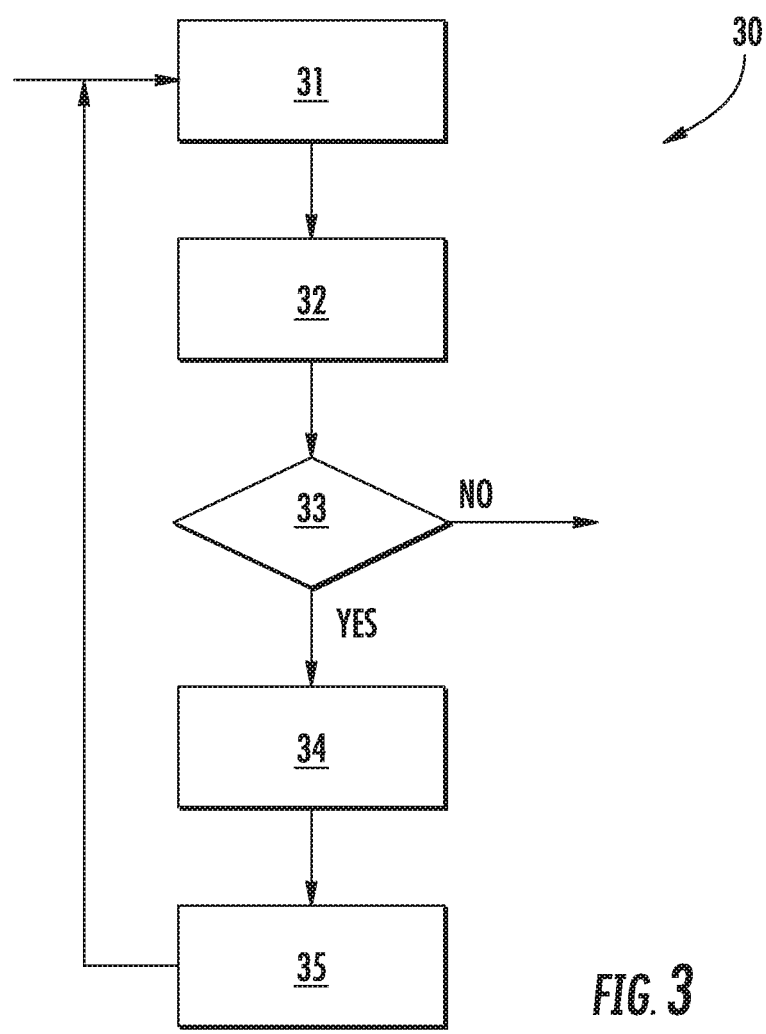

SYSTEMS AND METHODS FOR GENERATING SAFE TRAJECTORIES FOR MULTI-VEHICLE TEAMS

PRIORITY CLAIM

The present application claims the benefit of U.S. Patent Application Ser. No. 62/217,301, filed Sep. 11, 2015, the disclosure of which is incorporated herein by reference in its entirety.

GOVERNMENT INTEREST

This invention was made with government support under grant numbers N00014-09-1-1051 and N00014-09-1-103 awarded by the Office of Naval Research and 1113830 awarded by the National Science Foundation. The government has certain rights in the invention.

TECHNICAL FIELD

The subject matter disclosed herein relates generally to the control of multi-robot systems. More particularly, the subject matter disclosed herein relates to systems and methods that provide safe motion plans for robots in such multi-robot systems.

BACKGROUND

Multi-robot systems have become attractive solutions for a wide variety of tasks. At least one proposed initiative suggests using autonomous Unmanned Aircraft Systems (UASs) to deliver packages under five pounds to customers within a ten mile radius of a fulfillment center in less than 30 minutes. In this setting, hundreds to thousands of robots could be in the air simultaneously. Each robot is assigned a fixed and non-interchangeable goal, or labeled.

While it may seem promising to simply stagger the UASs' altitudes, recent Federal Aviation Administration (FAA) proposed guidelines [4] limit the maximum altitude of these small UASs to 400 feet, essentially confining vehicles to a narrow band of altitudes if not to a single horizontal plane. Thus, there may be issues finding safe motion plans for robots operating in essentially a two-dimensional space, which is harder than the three-dimensional version, because the latter provides an additional degree of freedom.

There are, broadly speaking, three guarantees of interest for planning algorithms: safety (i.e., robots will be collision-free with obstacles and each other), optimality (i.e., the solution is minimum cost), and completeness (i.e., the planner will always find a solution if one exists and indicate that there is none if one does not). Approaches to the labeled multi-robot planning problem can be characterized as coupled or decoupled. Coupled planners search for optimal paths in the joint configuration space of all team members, either by directly applying planning algorithms such as A* [7] or with specialized variants [6]. These approaches typically guarantee optimality and completeness. However, as the search space grows exponentially with the number of robots, they quickly become computationally impractical.

Decoupled planners, on the other hand, plan for each robot separately. One approach is to plan each robot's motion in priority order. Lower priority robots must avoid higher priority ones [1] [3]. An alternative is to first find paths that avoid static obstacles, then design velocity profiles that avoid inter-robot collisions [9] [11]. These planners tend to be faster, but are typically not complete.

As a result, algorithms that combine both approaches have been proposed. van den Berg et al. [17] decouple the problem into smaller coupled subproblems, minimizing the dimensionality of the highest-dimensional subproblem. Subdimensional expansion [18] first plans in each robot's individual configuration space and searches a joint state space in regions where collisions occur. These approaches offer significant computational improvements, but can still perform poorly in the worst case.

Other planning approaches include rule-based [2] or network flow [19] algorithms. Alternatively, van den Berg et al. [16] frame the problem as a reciprocal collision avoidance problem. In air traffic control, Tomlin et al. [13] find safe conflict resolution maneuvers in the presence of uncertainties. However, this approach requires computation of solutions to the Hamilton-Jacobi-Isaacs PDE equation, which becomes computationally difficult for large teams.

Other settings allow for robots to be completely interchangeable. Proposed solutions to the unlabeled multi-robot planning problem must solve both the task assignment and trajectory generation problems [14]. In particular, Turpin et al. propose an O(N3) solution to the unlabeled planning problem in obstacle-free environments [14] for teams of N robots.

Thus, despite these prior attempts to develop systems and methods that provide safe motion plans for robots, past algorithms have often been either not complete or not scalable. Accordingly, improved systems and methods would be desirable for finding collision-free trajectories for a team of labeled robots operating in an obstacle-free workspace.

SUMMARY

The proposed systems and methods design safe trajectories that navigate a team of robots from their known initial positions to a set of assigned goal positions, where the assigned goals are fixed and non-interchangeable. In these systems and methods, an optimal motion plan is defined for each robot. Each vehicle executes this optimal motion plan until an imminent collision appears. At this time, robots enter a holding pattern to resolve the imminent collision. In some embodiments, the systems and methods provide that the designed trajectories will be collision-free, is complete (i.e., it will always find a valid solution), and is scalable to teams of hundreds of robots.

In this regard, in accordance with this disclosure, systems and methods for generating trajectories for a plurality of vehicles in a multi-vehicle system are provided. In one aspect, a method is provided, the method including steps of determining an optimal motion plan for moving each of the plurality of vehicles between a respective starting position and an assigned goal position, identifying possible collisions among the optimal motion plans of the plurality of vehicles, and, for a subset of the plurality of vehicles identified as being associated with a possible collision, modifying the optimal motion plan of each vehicle in the subset to define modified trajectories that each include a common circular holding pattern such that the possible collision is avoided.

In other aspects, the methods disclosed herein may be implemented using a controller that is configured to perform the steps of the method. This controller may be located remotely from the plurality of vehicles (See, e.g., FIG. 1) or it may be integrated within one or more of the plurality of vehicles. In yet a further aspect, the methods disclosed herein may be embodied in a non-transitory computer readable medium having stored thereon executable instructions that when executed by the processor of a computer control the computer to perform the steps of the method.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 3 is a flow chart showing an overview of a motion plan according to an embodiment of the presently disclosed subject matter;

DETAILED DESCRIPTION

Figure 1:
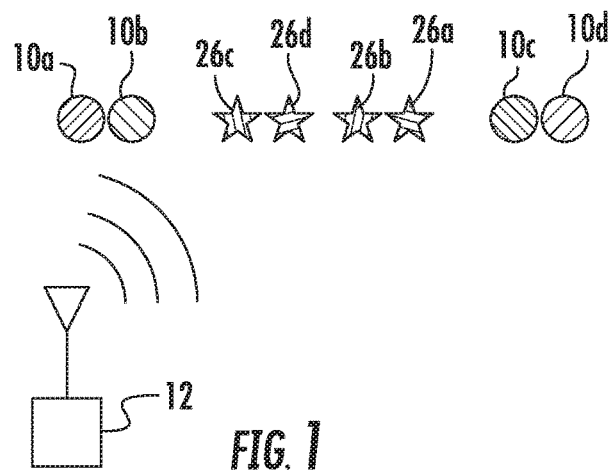
FIG. 1 is a schematic diagram of an exemplary multi-robot system in which robots begin at start positions indicated by circles and must navigate to assigned goal positions indicated by stars of the same color.

The present subject matter provides systems and methods to solve the trajectory generation problem for a large team of robots. In one aspect, the present subject matter provides systems and methods in which robots with different assigned start and goal positions travel along their own trajectories and are directed to enter a circular holding pattern if an imminent collision is detected. Each robot has a designated entry and exit point of the holding pattern, and the patterns are generated with an algorithm such that the creation of a new pattern will not create a new collision condition. Additional robots may enter the holding pattern if their own trajectories interfere with it, and each robot is prioritized to leave the pattern safely and proceed to its goal. In essence, each robot pursues its own optimal motion plan until an impending collision is detected. This approach is similar in some aspects to subdimensional expansion, but collisions are resolved through analytically constructed maneuvers as opposed to a high-dimensional graph search.

1. PROBLEM DEFINITION

Let $\mathcal{I}_Z = \{1, 2, \ldots Z_g\}$ denote the set of integers between 1 and Z, inclusive. Let N denote the number of robots in the team. The start and goal positions of robot $i \in \mathcal{I}_N$ are represented with $s_i \in \mathbb{R}^2$ and $g_i \in \mathbb{R}^2$ respectively, and the sets of all start and goal positions with S and G, respectively. x denotes a position in $\mathbb{R}^2$ and $x_i$ denotes the state of robot i. Each robot has identical first-order dynamics:

$$x_i = \dot{u}_i(t), \|u_i(t)\|_2 \leq v_{max} \quad (1)$$

In the centralized paradigm, each robot knows the states and goals of all robots.

A trajectory may be defined as a piecewise smooth function of time, $\gamma(t):[t_0,t_f] \to \mathbb{R}^2$. Let $\gamma(x_0,x_1)(t)$ denote an optimal trajectory between $x_0$ and $x_1$ and $\gamma_i(t)$ denotes robot i's trajectory between $s_i$ and $g_i$. Let $\gamma(t)$ denote the set of all trajectories $\gamma_i(t)$.

To provide safe movement relative to one another, in some embodiments, the size of each robot may be approximated to identify when a collision may be imminent. In this regard, for example, each robot may be modeled as a disk of radius R. We use $\mathcal{B}(x_i(t))$ to denote the area robot i occupies at $x_i(t)$ and $\mathcal{B}(\gamma_i)$ to denote the area it sweeps out traversing $\gamma_i(t)$.

The goal of the labeled planning problem is to plan a trajectory $\gamma_i(t)$ for each robot such that $\gamma_i(0) = s_i$, $\gamma_i(t_{f,i}) = g_i$. All robots' trajectories start simultaneously but each robot can reach its goal at a unique $t_{f,i}$. In some embodiments, it is assumed that robots remain stationary at their goals for all $t > t_{f,i}$, and it is desirable for $\mathcal{B}(x_i(t)) \cap \mathcal{B}(x_j(t))$ for all $t \in [0, \mathcal{B}_{,i}] j \neq i \in \mathcal{I}_N$.

2. CONCURRENT ASSIGNMENT AND PLANNING OF TRAJECTORIES (CAPT)

First, the unlabeled planning problem is considered: given N robots and M goals, a trajectory $\gamma_i(t)$ is planned for each robot such that each goal is visited by one robot. When M>N, some goals will remain unvisited while when M<N, some robots will not visit any goals. To solve this problem, the Concurrent Assignment and Planning of Trajectories (CAPT) algorithm [14] may be applied.

Suppose the start and goal locations are at least $2\sqrt{2}R$ away from each other:

$$\|s_i - s_j\|_2 > 2\sqrt{2}R \forall i \neq j \in \mathcal{I}_N, \|g_i - g_j\|_2 > 2\sqrt{2}R \forall i \neq j \in \mathcal{I}_M \quad (2)$$

The assignment mapping robots to goals may be defined as $\phi: \mathcal{I}_N \to \mathcal{I}_M \cup 0$, where $\phi_i = j$ indicates that robot i is assigned to goal j and $\phi_i = 0$ if robot i is unassigned. The CAPT algorithm finds the assignment and trajectories that solve:

$$\min_{\phi,\gamma(t)} \Sigma_{i=1}^N \int_0^{t_f} \dot{x}_i(t) dt \quad (3)$$

A solution to this problem consists of straight-line trajectories that minimize the sum of the squares of the distances traveled. In other words, the optimal assignment may be given by:

$$\phi^* = \underset{\phi}{\operatorname{argmin}} \sum_{i=1}^{N} \|s_i - g_{\phi i}\|_2^2 \quad (4)$$

This assignment may be found in $O(N^3)$ time using the Hungarian Algorithm [10].

The assigned goal of robot i may be denoted with $g_i^*$, where $g_i^* = s_i$ if robot i is unassigned and $g_i^* = g_{\phi^*_i}$ otherwise. The optimal trajectories are the constant velocity straight-line trajectories from $\gamma_i(0) = s_i$ to $\gamma_i(t_f) = g_i^*$. It can be desirable for all robots to arrive at their goals simultaneously at $t_f$, which may be found with:

$$t_f = \max_{i \in \mathcal{J}_N} \frac{\|s_i - g_i^*\|_2}{v_{max}} \quad (5)$$

Such trajectories can be referred to as synchronized. Turpin et al. show that these trajectories are collision-free [14].

3. OPTIMAL MOTION PLANS+CIRCULAR HOLDING PATTERNS (OMP+CHOP) FOR THE LABELED PLANNING PROBLEM

In view of this model, the presently disclosed subject matter provides systems and methods to solve the labeled planning problem. These systems and methods are designed to account for any of a variety of scenarios, including a collision-free scenario, in which all robots may move directly to their goals following an optimal motion plan (OMP), and a limiting scenario, in which all robots must enter a single circular holding pattern (CHOP).

3.1 Optimal Motion Plans (OMPs)

Given any two waypoints and times of arrival at these points, the present systems and methods may design an optimal trajectory taking robot i from $x_i(t_0) = x_0$ to $x_i(t_f) = x_f$ by solving:

$$\gamma^{(x_0, x_f)}(t) = \operatorname{argmin}_{\gamma(t)} \int_{t_0}^{t_f} \dot{x}_i(t)^T \dot{x}_i(t) dt$$

subject to: $\gamma(t_0) = x_0, \gamma(t_f) = x_f$ (6)

As before, the optimal trajectory is the constant-velocity straight-line path:

$$\gamma^{(x_0, x_f)}(t) = (x_f - x_0) \frac{t - t_0}{t_f - t_0} + x_0 \quad (7)$$

The Optimal Motion Plan (OMP) for a robot is the optimal trajectory from its current position to its goal. In the best case, all robots' OMPs from their start positions are collision-free. Then, for each robot, $\gamma_i(t) = \gamma^{(s_i, g_i)}(t)$, $t_0 = 0$, and $$t_{f,i} = \frac{\|s_i - g_i\|_2}{v_{max}}.$$

Trajectories are unsynchronized: all robots travel at $v_{max}$ to arrive at different times.

3.2 Circular Holding Patterns (CHOPs)

When the OMPs of the plurality of robots are not collision-free, however, the present systems and methods provide that at least a subset of the robots enter a Circular Holding Pattern (CHOP) to safely maneuver to their goals.

Algorithm 1 presents the CHOP construction algorithm and Sections 3.2.1-3.2.4 detail its key steps. Its inputs are the CHOP start time, $T_s$, the index set of robots involved, $\mathcal{R}_m$, a set of CHOP start positions, $X_s$, from which robots enter the CHOP, and the set of goals $X_g = \{g_i | i \in \mathcal{R}_m\}$. The equality sign denotes the assignment of a value, a left arrow indicates the addition of discrete elements to an existing set, and $X_{a,i}$ denotes element i of set $X_a$.

In some embodiments, it is assumed that all robots immediately enter a single CHOP. This represents the worst-case scenario, where robots are densely packed and smaller CHOPs cannot be created. In this case, the algorithm inputs are $\tau_s = 0$, $\mathcal{R}_m = \mathcal{J}_N$, $X_s = S$, $X_g = G$.

---

Algorithm 1 (m, $x_c$, $r_c$) = Create CHOP($\tau_s$, $\mathcal{R}_m$, $X_s$, $X_g$, R, $v_{max}$)

1: $N_m$ = number of robots in $\mathcal{R}_m$

2:
$$x_c = \frac{\sum_{i \in \mathcal{R}_{N_m}} X_{s,i}}{N_m} \quad \text{// Define center of the CHOP}$$

3: $n_w = 2N_m$ // Designate number of intermediate waypoints in the CHOP
4: $r_c$ = Find CHOP Radius($n_w$, $x_c$, $X_g$, R) //Find minimum safe radius for the CHOP
5: // Find the set of intermediate waypoints 6:
$$X_m = \left\{ x_c + r_c [\cos(\theta_i) \; \sin(\theta_i)]^T \mid \theta_i = (i-1)\frac{2\pi}{n_w}, i \in \mathcal{J}_{n_w} \right\}$$

7: // Assign entry waypoint for each robot
8: $X_w = \{X_{m,1}, X_{m,3}, \ldots, X_{m,n_w-1}\}$
9: $\phi^s$ = CAPT($X_s$, $X_w$)
10: // Define Exit Condition for each robot
11: for all $i \in \mathcal{J}_{N_m}$ do
12: $\quad \phi_i^g = \operatorname{argmin}_{j \in \mathcal{J}_{N_w}} \|X_{m,j} - X_{g,i}\|_2$ // Assign the exit waypoint
13: end for
14: $\mathcal{P}_i = \emptyset \; \forall i \in \mathcal{J}_{N_m}$ // Find priority sets
15: for all $i \in \mathcal{J}_{N_m}$ do
16: $\quad$ for all $j \in \mathcal{J}_{N_m} \backslash i$ do
17: $\quad\quad$ IF $\mathcal{B}(x_{g,i}) \cap \mathcal{B}(\gamma^{(x_{m,j}^g, x_{g,j})}) \neq \emptyset$ then
18: $\quad\quad\quad \mathcal{P}_i \leftarrow j$
19: $\quad\quad$ end if
20: $\quad$ end for
21: end for
22: (m) = Construct CHOP($\tau_s$, $\mathcal{R}_m$, $X_s$, $X_m$, $X_g$, $\phi^s$, $\phi^g$, $\mathcal{P}$, $v_{max}$)

---

3.2.1 Define Intermediate Waypoints

A set of $n_w$ intermediate waypoints, $X_m$, is distributed evenly about a circle with center x, and radius $r_c$. In some embodiments, these waypoints satisfy one or more safety conditions:

1. The distance between all points in the set $X_w$, defined in Line 8, is at least $2\sqrt{2}R$.
2. The distance of every goal in $X_g$ from every waypoint in $X_m$ is at least $2\sqrt{2}R$.
3. The distance of every goal in $X_g$ from every path between a pair of consecutive intermediate waypoints in $X_m$ is at least $2R$.

In some embodiments, $n_w$ is designated as twice the number of robots in $\mathcal{R}_m$, and $x_c$ as the mean of the robots' start positions. $r_c$, the minimum radius that satisfies the safety criteria, may be found analytically. Note that robots' goals may be inside or outside the CHOP.

3.2.2 Define Entry Waypoints

To enter a CHOP, robots move synchronously from their CHOP start positions to an intermediate waypoint designated as their entry waypoint. In some embodiments, every other waypoint from $X_m$ is chosen to form the set of candidate entry waypoints, $X_w$. (See, e.g., Line 8 of Algorithm 1) In some embodiments, these waypoints are assigned to robots with the optimal assignment returned by the CAPT algorithm when considering $X_s$ as start positions and $X_w$ as goals. (See, e.g., Line 9 of Algorithm 1)

3.2.3 Define Exit Conditions

Next, robots synchronously visit intermediate waypoints in a sequential order (e.g., clockwise about the CHOP) until they satisfy their Exit Condition (EC). First, in some embodiments, the intermediate waypoint closest to each robot's goal is assigned as its exit waypoint. (See, e.g., Lines 11-13 of Algorithm 1) Robots can only exit the CHOP from this waypoint. Second, each robot's priority set, $\wp_i$, may be constructed. (See, e.g., Lines 14-21 of Algorithm 1) A robot can exit via its exit waypoint only if all robots in $\wp_i$ have exited. In this regard, in some embodiments, if robot i remaining stationary at its goal will result in a collision with robot j moving towards its goal, the present systems and methods may control each robot's priority set, $\wp_i$, such that robot i cannot exit before robot j.

3.2.4 Construct CHOP

To execute a CHOP, each robot follows optimal trajectories to sequentially visit its CHOP start position, its entry waypoint, a series of intermediate waypoints, and its exit waypoint at the appropriate times. Upon satisfying its EC, it returns to pursuing an OMP starting from its exit waypoint. Thus, in some embodiments, the motion of all robots can be fully represented in a CHOP with $m=\{\{X_i | i \in \mathcal{R}_m\}, T, T_{goal}\}$. $X_i$ is the series of waypoints robot i visits, starting from its CHOP start position and ending with its exit waypoint. In some embodiments, the sets $X_i$ can be different lengths. $|T|=\{t_1, t_2, \ldots\}$ indicates arrival times at waypoints, where robot i must be at position $X_{i,j}$, if it exists, at time $t_j$. T is common to all robots, and $|T|=max_{i \in \mathcal{R}_m}|X_i|$, where $|\cdot|$ denotes a set's cardinality. Finally, $T_{goal}=\{t_{goal,i}|i \in \mathcal{R}_m\}$ is a series of goal arrival times. In this regard, robot i is controlled to reach its goal at time $t_{goal,i}$ after exiting the CHOP.

We already know $X_i$ for each robot. In additional, the series T and $T_{goal}$ may further be defined. (See, e.g., Line 22 of Algorithm 1) To guarantee safety, trajectories between waypoints in the CHOP and the OMPs of robots that have exited may all be synchronized. To achieve this while respecting all robots' velocity constraints, the present systems and methods define $t_1=\tau_s$ and:

$$t_j = t_{j-1} + \max_{i \in \mathcal{R}_{m_j}} \frac{\|x_{next,i} - X_{i,j-1}\|_2}{v_{max}} \quad j=2, \ldots, j_{max} \quad (8)$$

Here, $j_{max}=\mathcal{R}|X_i|$. $\mathcal{R}_{mj} \subseteq \mathcal{R}_m$ is the subset of indices for which $|X_i| \geq j-1$, $x_{next,i}$ refers to $X_{i,j}$ if $|X_i| \geq j$ and $X_{g,i}$ if $|X_i|=j-1$. Then:

$$t_{goal,i} = \begin{cases} t_{|X_i|+1} & \text{if } |X_i| < j_{max} \\ t_{j_{max}} + \max_{i \in \mathcal{R}_{m_{j_{max}}}} \frac{\|G_i + X_{i,j_{max}}\|_2}{v_{max}} & \text{if } |X_i| = j_{max} \end{cases} \quad (9)$$

The CHOP exit time may also be defined for each robot, denoted $\tau_{f,i}$, as the time it leaves its exit waypoint.

3.2.5 First Example Systems and Methods

Referring to FIG. 1, an example of a multi-robot system is illustrated. In this embodiment, first, second, third, and fourth robots 10a, 10b, 10c, and 10d begin at start positions and must navigate to respective first, second, third, and fourth goal positions 26a, 26b, 26c, and 26d. In some embodiments, a controller 12 that is remote from robots may be configured to communicate with each of the robots and provide the motion plan to the robots. In this regard, for example, controller 12 may be in communication with a transmitting device that is configured to transmit motion plans to the robots. Alternatively, each of the robots may be substantially autonomous, with an on-board controller being integrated with each robot for generating a motion plan.

Figure 2A:
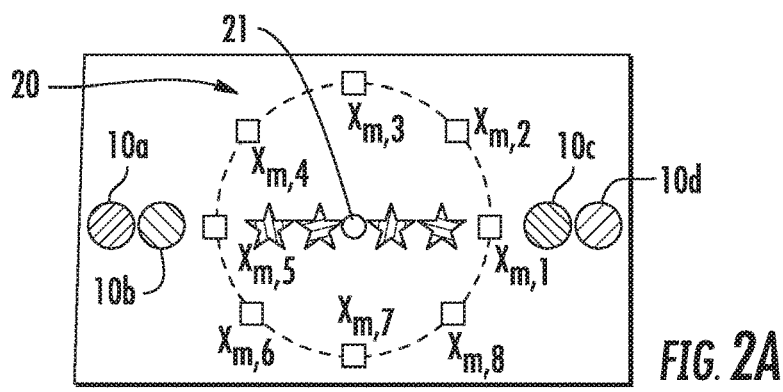
FIGS. 2A through 2C show steps of identifying elements of an optimal motion plan according to an embodiment of the presently disclosed subject matter.
Figure 2B:
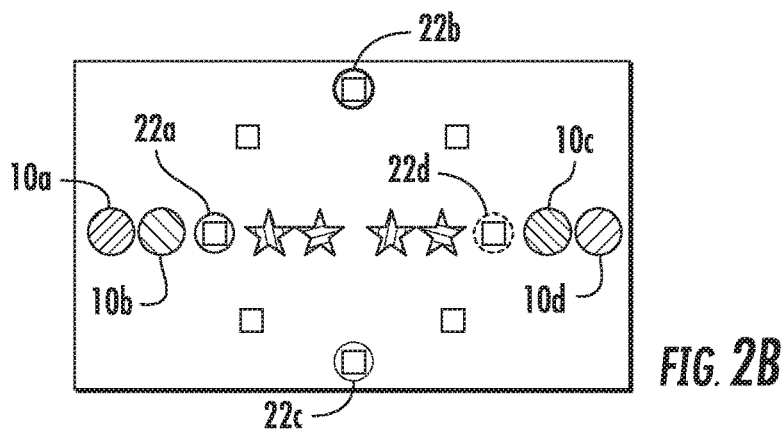
Figure 2C:
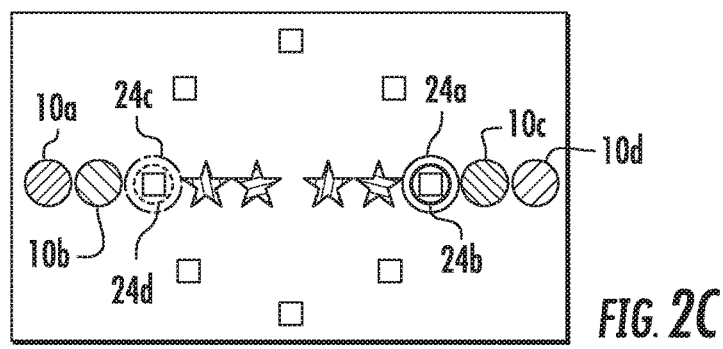
Figure 2D:
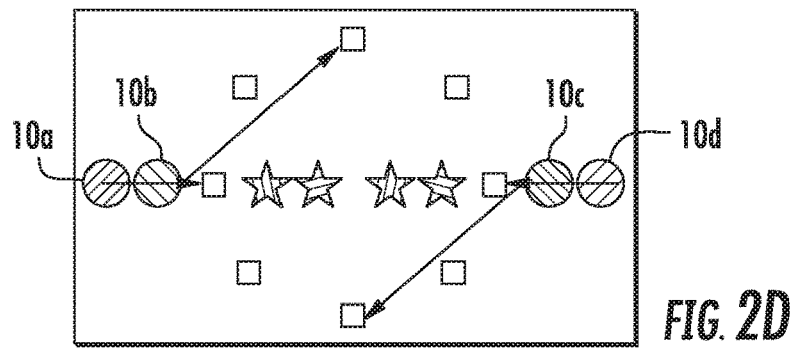
FIGS. 2D through 2G illustrate the execution of a motion plan according to an embodiment of the presently disclosed subject matter.
Figure 2E:
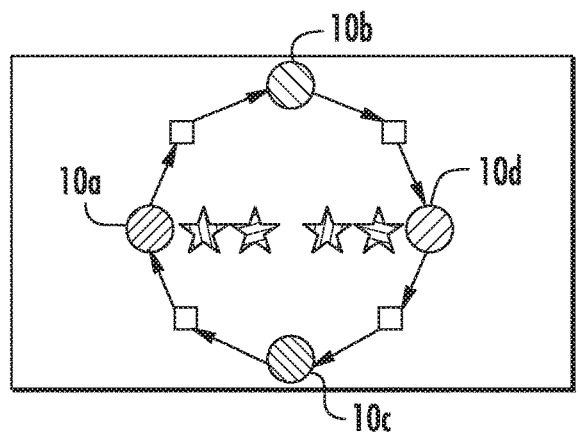
Figure 2F:
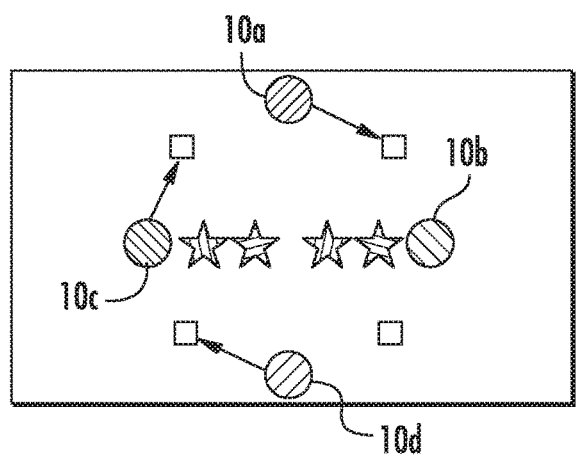

With these conditions, a CHOP, generally designated 20, may be defined to prevent collisions among first, second, third, and fourth robots 10a, 10b, 10c, and 10d. As illustrated in FIG. 2A, CHOP 20 may be defined by a plurality of intermediate waypoints $X_{m,1}$ through $X_{m,8}$ arranged about a center 21 as discussed above. In the illustrated embodiment, CHOP 20 comprises eight intermediate waypoints (i.e., two times the number of robots), although the subject matter of the present systems and methods includes alternative embodiments in which more or fewer intermediate waypoints are provided. Among these intermediate waypoints, a subset are defined as the start positions within CHOP 20 for the motion plans of first, second, third, and fourth robots 10a, 10b, 10c, and 10d. FIG. 2B shows fifth, third, seventh, and first intermediate waypoints $X_{m,5}$, $X_{m,3}$, $X_{m,7}$, and $X_{m,1}$ being assigned as first, second, third, and fourth entry waypoints 22a, 22b, 22c, and 22d, respectively, for a corresponding one of first, second, third, and fourth robots 10a, 10b, 10c, and 10d. Similarly, each of first, second, third, and fourth robots 10a, 10b, 10c, and 10d may be assigned one of the intermediate waypoints as its assigned exit waypoint within CHOP 20. In some embodiments, such as is illustrated in FIG. 2C, multiple robots may be assigned the same exit waypoint. In the illustrated embodiment, for example, first intermediate waypoint $X_{m,1}$ is assigned as both a first exit waypoint 24a and a second exit waypoint 24b for first and second robots 10a and 10b, respectively, and fifth intermediate waypoint $X_{m,5}$ is assigned as both a third exit waypoint 24c and a fourth exit waypoint 24d for third and fourth robots 10c and 10d, respectively.

Figure 2G:
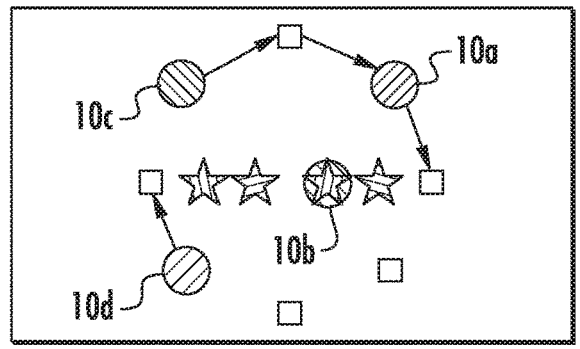

Based on these conditions, FIGS. 2D through 2G illustrate the resulting motion plan in which each robot enters CHOP 20 at its assigned entry waypoint (See, e.g., FIG. 2D), each of the robots moves synchronously in sequence about CHOP 20 (See, e.g., FIG. 2E), one or more of the robots moves out of CHOP 20 upon reaching an assigned exit waypoint (See, e.g., FIG. 2F), and the exiting robot(s) move in accordance with their resumed OMP (See, e.g., FIG. 2G).

As an example, the planned trajectory of second robot 10b may be designed as follows:

$$\gamma_2(t) = \begin{cases} \gamma^{(s_2, X_{m,3})}(t) & t_0 \leq t \leq t_1 \\ \gamma^{(X_{m,3}, X_{m,2})}(t) & t_1 < t \leq t_2 \\ \gamma^{(X_{m,2}, X_{m,1})}(t) & t_2 < t \leq t_3 \\ \gamma^{(X_{m,1}, g_2)}(t) & t_3 < t \leq t_{exit,2} \end{cases} \quad (10)$$

3.3 The Motion Planning Algorithm

In a further aspect of the presently disclosed subject matter, the disclosed systems and methods may combine the previous techniques into a single motion planning algorithm, referred to as OMP+CHOP, which allows robots to follow their OMPs when possible and directs them into appropriately designed CHOPs in congested areas. This algorithm is presented in Algorithm 2 and described in detail below.

---
Algorithm 2 $\gamma$ = OMP_CHOP(S,G,R,$v_{max}$)
---
1: $\mathcal{M}$ = ∅
2: $\gamma$ = Compute Motion Plan (S,G,$\mathcal{M}$)
3: $\mathcal{C}$ = Find Imminent Collision($\gamma$,R)
4: while $\mathcal{C}$ ≠ ∅ do
5:    ($\tau_s$,$\mathcal{M}_{add}$,$X_s$,$X_g$,$\mathcal{M}_{add}$) = Compute CHOP Parameters($\gamma$,$\mathcal{M}$,$\mathcal{C}$,G)
6:    ($m_{new}$,$x_c$,$r_c$) = Create CHOP($\tau_s$,$\mathcal{M}_{add}$,$X_s$,$X_g$,R,$v_{max}$)
7:    $\mathcal{M}$ ← $m_{new}$
8:    $\mathcal{M}$ = Remove CHOPs($\mathcal{M}_{add}$)
9:    $\gamma$ = Compute Motion Plan (S,G,$\mathcal{M}$)
10:   $\mathcal{C}$ = Find Imminent Collision($\gamma$,R)
11: end while
---

3.3.1 Compute Motion Plan $\mathcal{M}$ contains the set of all CHOPs in the motion plan, from which the set of trajectories $\gamma$ can be derived. Initially, $\mathcal{M}$ is empty and all robots follow their OMPs from their start positions. (See, e.g., Line 2 of Algorithm 2) When $\mathcal{M}$ contains CHOPs, each robot follows its OMP until its earliest CHOP's start time. (See, e.g., Line 9 of Algorithm 2) It then follows optimal trajectories to each waypoint designated by the CHOP to its exit waypoint, when it again pursues an OMP until it encounters another CHOP or its goal.

As illustrated in FIG. 3, for example, a motion plan may be computed according to a plan generation method, generally designated 30. First, for a given set of start and goal conditions of each robot (e.g., $s_i$, $g_i$), an OMP generation step 31 is performed to determine an optimal motion plan for moving each of the plurality of robots between a respective starting position and an assigned goal position. After the OMPs of all robots are computed, a collision detection step 32 identifies any imminent collisions among the OMPs. A collision presence step 33 determines whether or not any imminent collisions were detected. If no collisions are detected, the motion plan may be considered complete. If one or more collisions are detected, however, one or more CHOPs may then be defined in a CHOP selection step 34, and the exit conditions for each robot in the CHOP (e.g., selection of exit waypoints discussed above) may be defined in an exit selection step 35. In this way, for a subset of the robots identified as being associated with a possible collision, the optimal motion plan of each robot in the subset is modified to define modified trajectories that each include the CHOP such that the possible collision is avoided. The choice of CHOP parameters, described in Section 3.3.3 below, may guarantee that CHOPs in $\mathcal{M}$ will always start along its robots' OMPs. Plan generation method 30 may be repeated as many times as necessary until no collisions are detected.

We will use a subscripted variable, such as $m_k$, to denote a particular CHOP in $\mathcal{M}$ and $\mathcal{R}_{mk}$, $\tau_{s,mk}$, $\tau_{f,i,mk}$ to denote the indices of its robots, its start time, and the CHOP exit time of robot i∈$\mathcal{R}_{mk}$, respectively.

3.3.2 Find Imminent Collisions (ICs)

In some embodiments, the first Imminent Collision (IC) amongst robots following trajectories $\gamma$ is identified. (See, e.g., Line 3 of Algorithm 2, collision detection step 32) A collision may be characterized by its time, $t_c$, the number of robots in collision, $N_c$, and the set of indices of the colliding robots, $\mathcal{C}$. For all robots i∈$\mathcal{C}$, there must be at least one j≠i∈$\mathcal{C}$ for which $\mathcal{B}(x_i(t_c)) \cap \mathcal{B}(x_j(t_c)) \neq \emptyset$. We will use $\mathcal{C}$ to denote both the collision and the set of robots in the collision.

3.3.3 Create Local CHOP

The parameters of a new CHOP, denoted $m_{new}$, may be identified to resolve the detected IC. (See, e.g., Line 5 of Algorithm 2, CHOP selection step 34 and exit selection step 35) This function is presented in Algorithm 3.

---
Algorithm 3 ($\tau_s$, $\mathcal{M}_{add}$,$X_s$,$X_g$,$\mathcal{M}_{add}$) = Compute CHOP Parameters($\gamma$,$\mathcal{M}$,$\mathcal{C}$,G)
---
1: $\mathcal{M}_{add}$ = ∅, $\mathcal{M}_{add}$ = $\mathcal{C}$, $t_s$ = $t_g$, merge = 1 // Initialize variables
2: $\mathcal{M}_{curr}$ = {$m_k$ ∈ $\mathcal{M}$ | ∃ r ∈ $\mathcal{C}$ ∩ $\mathcal{R}_{mk}$ for which $t_c$ ∈ $\tilde{\tau}_{g,mg},\tau_{f,r,mg}$}}
3: while true do
4:   // Find valid starting conditions
5:   $\tilde{\tau}$ = max$_{t \leq t_d}$ i such that ||$x_i(t) - X_j(\tau)$||$_2$ ≥ 2√2R ∀j ≠ i ∈ $\mathcal{M}_{add}$
6:   $X_s$ = {$x_i(\tilde{\tau})$|i ∈ $\mathcal{M}_{add}$}, $X_g$ = {$g_i$ | i ∈ $\mathcal{M}_{add}$}
7:   If merge == 0, break end if
8:   ($m_{curr}$,$x_c$,$r_c$) = Create CHOP($\tilde{\tau}$, $\mathcal{M}_{add}$,$X_s$,$X_g$,R,$v_{max}$)
9:   // Merge robots and CHOPs whose paths intersect $m_{curr}$'s circle
10:   $t_a$ = $t_{l,m_{curr}}$,$t_b$ = max$_{i \in \mathcal{M}_{add}} \tau_{f,l,m_{curr}}$
11:   l = Set of paths that all robots r ∈ $\mathcal{R}_N \setminus \mathcal{M}_{add}$ traverse between [$r_a$,$r_b$]
12:   $\mathcal{M}_{OMP}$ = Robots whose OMP's paths are in l and intersect a circle at $x_c$, radius $r_c$ + 2R
13:   $\mathcal{M}_{curr}$ ← CHOPs whose paths are in l and intersect a circle at $x_c$, radius $r_c$ + 2R
14:   // Merge CHOPs that will cause conflicting motion plans for robots in $\mathcal{M}_{add}$
15:   $\mathcal{M}_{add}$ ← $\mathcal{M}_{OMP}$ ∪ {$\mathcal{M}_{mj}$| $m_j$ ∈ $\mathcal{M}_{curr}$}
16:   for r ∈ $\mathcal{M}_{add}$ do
17:     $\tau_{min,r}$ = min($\tilde{\tau}$ ∪ {$\tilde{\tau}_{,mj}$ | $m_j$ ∈ $\mathcal{M}_{curr}$ and r ∈ $\mathcal{R}_{mj}$})
18:   end for
19:   $\mathcal{M}_{curr}$ ← {$m_g$ ∈ $\mathcal{M}$ | ∃r ∈ $\mathcal{R}_{mg}$ ∩ $\mathcal{M}_{add}$ and $\tau_{f,r,mg}$ ≥ $\tau_{min,r}$}
20:   // Merge CHOPs that contain two or more common robots with $R_{add}$
21:   $\mathcal{M}_{add}$ ← {$\mathcal{R}_{mj}$| $m_j$ ∈ $\mathcal{M}_{curr}$}
22:   $\mathcal{M}_{curr}$ = {$m_k$ ∈ $\mathcal{M}$ | | $\mathcal{M}_{add}$ ∩ $\mathcal{R}_{mg}$ | ≥ 2}
23:   // If any additional robots or CHOPs were identified to be merged, iterate again
24:   If $\mathcal{M}_{OMP}$ ≠ ∅ or $\mathcal{M}_{curr} \setminus \mathcal{M}_{add}$ ≠ ∅ then
25:     $\mathcal{M}_{add}$ ← $\mathcal{M}_{curr}$, $\mathcal{M}_{add}$ ← {$\mathcal{R}_{mj}$| $m_j$ ∈ $\mathcal{M}_{curr}$}, $t_g$ = min($\tilde{\tau}$ ∪ {$\tilde{\tau}_{,mj}$ | $m_j$ ∈ $\mathcal{M}_{curr}$})
26:     merge = 1, $\mathcal{M}_{curr}$ = ∅
27:   else
28:     merge = 0
29:   end if
30: end while
---

$m_{new}$ is characterized by the set of indices of the robots it contains, $\mathcal{R}_{add}$. As shown in Line 1 of Algorithm 3, $\mathcal{R}_{add}$ may initially contain only robots in the IC. Additionally, in some embodiments, existing CHOPs in $\mathcal{M}$ may be merged with $m_{new}$. These CHOPs are contained in $\mathcal{M}_{add}$, which is initially empty. $\mathcal{M}_{curr}$, also initially empty, contains only the CHOPs to be merged that were identified in the most recent iteration.

Algorithm 3 may then grow $\mathcal{R}_{add}$ and $\mathcal{M}_{add}$ until a valid CHOP is constructed. Line 2 indicates that if any robots in $\mathcal{C}$ are executing a CHOP when the IC occurs, their CHOPs must be merged with $m_{new}$. Lines 5-6 defines the CHOP start time and start positions for the current $\mathcal{R}_{add}$. In some embodiments, defining the CHOP start time and start positions includes selecting start positions that are on robots' OMPs. Line 8 creates $m_{curr}$, the CHOP defined by the current $\mathcal{R}_{add}$. In some embodiments, additional robots and CHOPs are added based on three merging conditions:

1. Add robots and CHOPs whose paths intersect $m_{curr}$'s circle (See, e.g., Lines 10-13 of Algorithm 3), so when moving between intermediate waypoints, robots in $m_{curr}$ will be collision-free, even with robots not in the CHOP. Note that the present systems and methods only consider robots' paths, which simplifies this condition to fast line segment-circle intersection tests.
2. Merge CHOPs that will cause conflicting motion plans for robots in $\mathcal{R}_{add}$ (See, e.g., Lines 15-19 of Algorithm 3), so $\mathcal{M}$ will translate to a valid motion plan.
3. Merge CHOPs that contain two or more common robots with $\mathcal{R}_{add}$ (See, e.g., Lines 21-22 of Algorithm 3). This ensures that no two robots will be in the same CHOP more than once, which will help provide algorithm completeness.

Any new robots are added to $\mathcal{R}_{add}$ (See, e.g., Line 21 of Algorithm 3), and any new CHOPs are merged (See, e.g., Line 25 of Algorithm 3). To merge the CHOPs in $\mathcal{M}_{add}$, their constituent robots are added to $\mathcal{R}_{add}$. If any merged CHOPs occur before $m_{curr}$, $m_{curr}$'S start time is shifted to the earliest start time. We then reconstruct $m_{curr}$ with the updated $\mathcal{R}_{add}$ and iterate again as necessary.

With the returned parameters, the present systems and methods use Algorithm 1 to create the new CHOP, $m_{new}$, which is added to $\mathcal{M}$. The merged CHOPs in $\mathcal{M}$ add are removed. A new motion plan is computed and the next IC is resolved until the motion plan is collision-free.

3.3.4 Second Example Systems and Methods

Figure 4A:
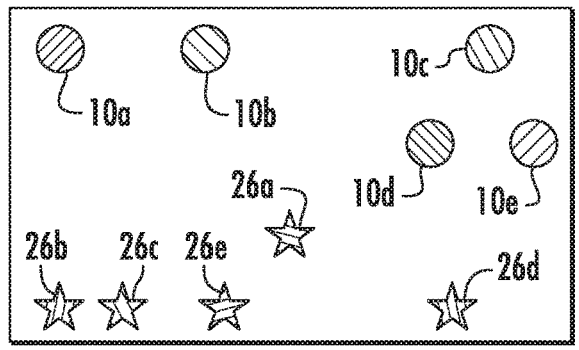
FIGS. 4A through 4F illustrates the iterative development of an optimal motion plan according to an embodiment of the presently disclosed subject matter.
Figure 4B:
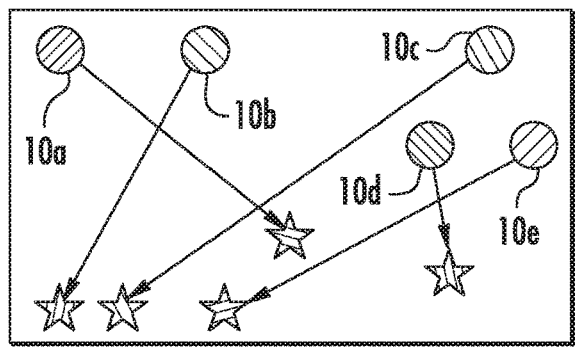
Figure 4C:
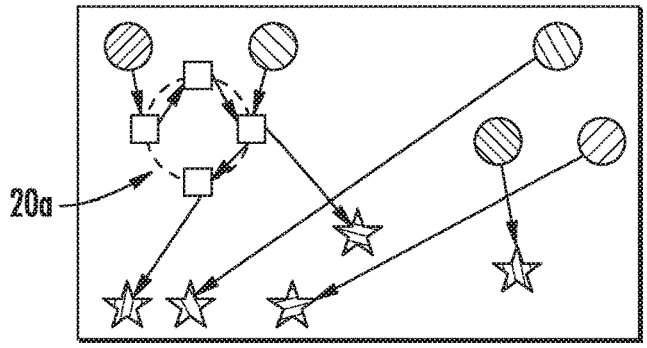
Figure 4D:
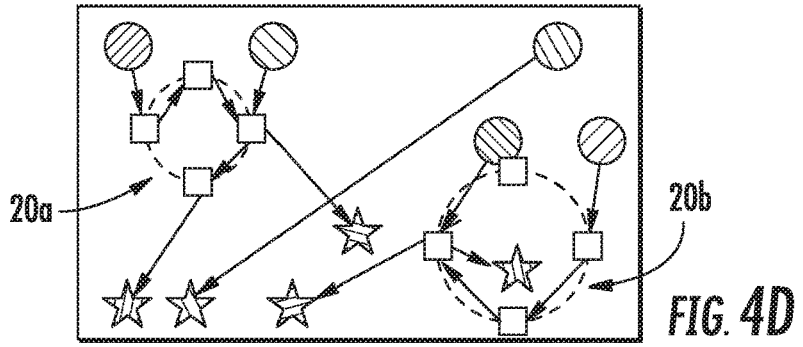

FIGS. 4A through 4F illustrate an implementation of Algorithms 2 and 3 for a situation in which first, second, third, fourth, and fifth robots 10a, 10b, 10c, 10d, and 10e have associated first, second, third, fourth, and fifth goal positions 26a, 26b, 26c, 26d, and 26e, respectively. FIG. 4B shows an initial motion plan, where $\mathcal{M} = 0$ and all robots follow their OMPs from their start positions. FIGS. 4C and 4D show the motion plans after the first two ICs are resolved. Specifically, in the illustrated scenario, a first CHOP 20a is defined in response to the identification of an imminent collision between first and second robots 10a and 10b (See, e.g., FIG. 4C), and a second CHOP 20b is defined in response to the identification of an imminent collision between fourth and fifth robots 10e and 10e (See, e.g., FIG. 4D).

Figure 4E:
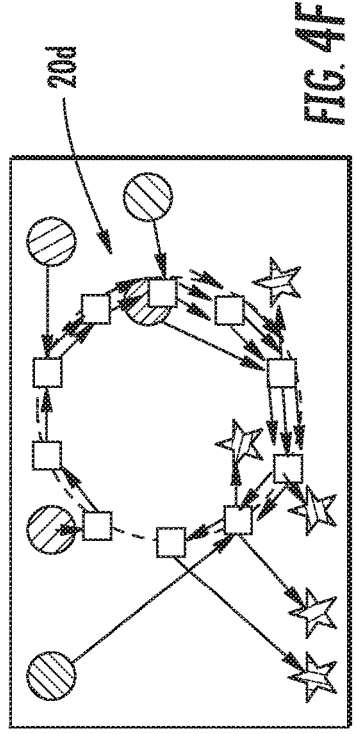

After resolving these first two ICs, a further IC between first and third robots 10a and 10c is detected. A third CHOP 20c illustrated in FIG. 4E represents $m_{curr}$, the initial CHOP created in Line 1 of Algorithm 3, where $\mathcal{R}_{add} = \mathcal{C} = \{1, 3\}$. The OMP paths of fifth robot 10e and second robot 10b in first CHOP 20a are found to intersect third CHOP 20c. (See, e.g., Lines 12-13 of Algorithm 3) Thus, $\mathcal{R}_{OMP} = \{5\}$, $\mathcal{M}_{curr} = \{m_1\}$. At Line 15, $\mathcal{R}_{add} = \{1,2,3,5\}$. Evaluating Line 19, second CHOP 20b contains fifth robot 10e, which is in $\mathcal{R}_{add}$, and $\tau_{f,m2,5} > \tau_{min,5} = \tau_{s,mcurr}$. Thus, second CHOP 20b is added to $\mathcal{M}$. Lines 21-22 will not change $\mathcal{R}_{add}$ or $\mathcal{M}_{curr}$. Finally, from Line 25, $t_s = \tau_{m1}$, $\mathcal{R}_{add} = \{1,2,3,4,5\}$, and $\mathcal{M}_{add} = \{m_1, m_2\}$. No further additions to $\mathcal{R}_{add}$ or $\mathcal{M}_{add}$ are needed.

Figure 4F:
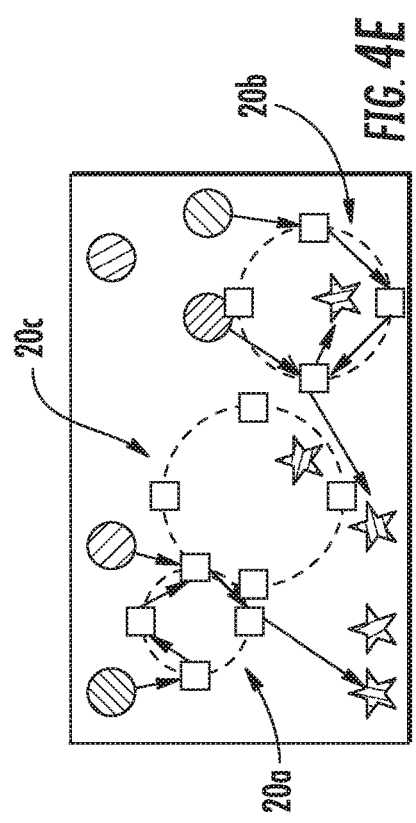

A fourth CHOP 20d (e.g., $m_{new}$) may be created and added to $\mathcal{M}$, and first and second CHOPs 20a and 20b may be removed from $\mathcal{M}$. Where no other ICs exist, FIG. 4F illustrates the resulting motion plan.

Those having skill in the art will note that Algorithm 2 may be modified to accommodate vehicles with a lower velocity bound, $v_{min}$, instead of $v_{max}$. With an additional constraint that intermediate waypoints of a given CHOP 20 must be at least $2\sqrt{2}R$ away from its start positions, the minimum length of any synchronized trajectory is $d_{min} = 2\sqrt{2}R$. The maximum length is $d_{max} = \sqrt{2}r_{c,max}$, where $r_{c,max}$ is the radius of a CHOP involving all N robots and contains all goals in G. Thus, running Algorithm 2 with $$v_{max} = v_{min} \frac{d_{max}}{d_{min}}$$

will ensure that robots will not travel slower than $v_{min}$.

3.4 Safety

Theorem 1: Robots are collision-free when executing a CHOP from Algorithm 1.

Proof: Consider a CHOP $m = \{\{X_i | i \in \mathcal{R}_m\}, T, T_{goal}\}$ with final goals $X_g$. Let $X_s^k = \{X_{i,k-1} | i \in \mathcal{R}_{mk}\}$ denote the positions of robots in $\mathcal{R}_{mk}$ at $t_{k-1}$ and $X_g^k$ denote the set $\{x_{next,i} | i \in \mathcal{R}_{mk}\}$. Here, $\mathcal{R}_{mk}$ and $x_{next,i}$ are defined as in Eq. 8. It can be shown that robots' trajectories are collision-free for all $k=2, \ldots, max_{i \in \mathcal{R}m} |X_i|+1$.

The present systems and methods use the CAPT algorithm to assign entry waypoints, so for $k=2$, when robots move from their CHOP start positions to their entry waypoints, the assignment of goals $X_g^k$ to robots at $X_s^k$ minimizes the total distance squared. In subsequent intervals, $X_s^k$ contains only intermediate waypoints while $X_g^k$ can contain both intermediate waypoints and goals. Suppose robot $i\varepsilon$ $\mathcal{R}_{mk}$ is moving between intermediate waypoints. Robots enter at every other intermediate waypoint and subsequent rotations are synchronized, so $X_{i,j} \neq X_{j,k-1} \forall j \neq i \in \mathcal{R}_{mk}$. Thus:

$$\|X_{i,k} - X_{i,k-1}\|_2^2 \leq \|X_{i,k} - X_{j,k-1}\|_2^2 \forall j \neq i \in \mathcal{R}_{m_k} \quad (11)$$

Now, it is supposed that robot i is moving from its exit waypoint to its goal, by design, the exit waypoint is the closest intermediate waypoint to the goal. Thus:

$$\|X_{g,i} - X_{i,k-1}\|_2^2 \leq \|X_{g,i} - X_{j,k-1}\|_2^2 \forall j \neq i \in \mathcal{R}_{m_k} \quad (11)$$

As a result, no alternate assignment of points in $X_s^k$ to those in $X_g^k$ will result in paths with a lower total distance squared than the CHOP's specified assignment. Thus, in each time interval, robots move from their positions in $X_s^k$ to the one in $X_g^k$ that coincides with the minimum total distance squared assignment.

Line 5 of Algorithm 3 and safety conditions 1 and 2 of Algorithm 1 guarantee positions in $X_s^k$ and $X_g^k$ for all k meet the separation conditions in Eq. 2. The CAPT algorithm guarantees all synchronized trajectories between waypoints are collision-free [14]. Finally, safety condition 3 and the priority sets in Algorithm 1 ensure robots stationary at their goals will not collide with moving robots.

By assigning inter-waypoint motions that match the optimal unlabeled allocation, the present systems and methods inherit the collision avoidance guarantees of the CAPT algorithm. In essence, the present systems and methods use a series of solutions to the unlabeled problem to move towards labeled goals.

3.5 Completeness

Theorem 2. Algorithm 2 is complete.

Proof: To be complete, an algorithm must always find a collision-free motion plan in finite time if one exists and indicate that there is no solution when one does not. From Thm. 1, a CHOP containing all N robots will always be a valid solution.

It must then be additionally shown that Algorithm 2 returns a solution in finite iterations. First, it can be noted that Algorithm 3 always returns in finite iterations, as there are finite numbers of robots and CHOPs that can be added to $\mathcal{R}_{add}$ and $\mathcal{M}_{add}$, and elements are never removed. Define $\mathcal{A}$ as the set of interactions in $\mathcal{M}$. An interaction is a pair of indices of robots, $\{i, j\}$, such that $i, j \in \mathcal{R}_m$ for some $m \in \mathcal{M}$. For example, in FIG. 4D, $\mathcal{A} = \{\{1, 2\}, \{4, 5\}\}$. When all robots are in a single CHOP, $\mathcal{A} = [\mathcal{I}_N]^2$.

In each iteration of Algorithm 2, either the algorithm terminates, or a new CHOP is added to $\mathcal{M}$. In the latter case, the set of interactions in $\mathcal{A}$ is strictly growing.

To see this, first note that at each iteration, all removed CHOPs have been merged into $m_{new}$, so interactions are never removed. Alternatively, $\mathcal{A}$ may remain unchanged. This can only occur if $\mathcal{M}_{add}$ contains a single CHOP, $m_1$, identical to $m_{new}$. Suppose $m_{new}$ resolves the IC, $\mathcal{C}$. Then, $\mathcal{C} \subseteq \mathcal{R}_{mnew} = \mathcal{R}_{m1}$. $m_1$ resolves the first IC between robots in $\mathcal{C}$ and guarantees they reach their goals collision-free. Thus, robots in $\mathcal{C}$ can only collide if they abandon their OMPs to enter other CHOPs. Let $\mathcal{M}_{after}$ be the set of CHOPs that robots in $\mathcal{C}$ enter after exiting $m_1$. CHOPs in $\mathcal{M}_{after}$ fulfill merging condition 2, so $\mathcal{M}_{after} \in \mathcal{M}_{add}$, and $\mathcal{M}_{add} \neq \{m_1\}$. We have a contradiction, so $\mathcal{A}$ must contain at least one new interaction.

Merging condition 3 guarantees that robots will interact at most once. In finite iterations, $\mathcal{A}$ will contain all unique interactions. This represents the case where all robots are in a single CHOP, which is a collision-free motion plan.

4. SIMULATION RESULTS

Finally, we examine the algorithm's performance in simulations. Experiments were done on a 2.5 GHz Macbook Pro in MATLAB and C++ Mex, with a maximum algorithm runtime of 10 minutes.

A solution's sub-optimality ratio may be defined using the total distance of its paths:

$$r_d = \frac{\sum_{i=0}^{N} \int_0^{t_{f,i}} \dot{\gamma}_i(t) dt}{\sum_{i=0}^{N} \|s_i - g_i\|_2} \quad (13)$$

The denominator is an underestimate of the optimal total distance, as for problems like FIG. 2A, the straight-line paths to goals have no collision-free velocity profile.

To detect ICs, the present systems and methods may sample trajectories at $$dt = \frac{R}{v_{max}},$$

where R=1, $v_{max}$=5, to ensure no collisions occur between samples. The present systems and methods may check for collisions using a spatial hashing algorithm [8] and further eliminate checks for robots moving between intermediate waypoints and between pairs of robots executing the same CHOP.

4.1 Variations in Team Size

To examine the effect of the team's size on computation time, case studies for 500 robots were randomly generated. Then, 400 start-to-goal assignments were subsampled from the original set, 300 assignments were subsampled from the remaining set of 400, and so on.

Figure 5A:
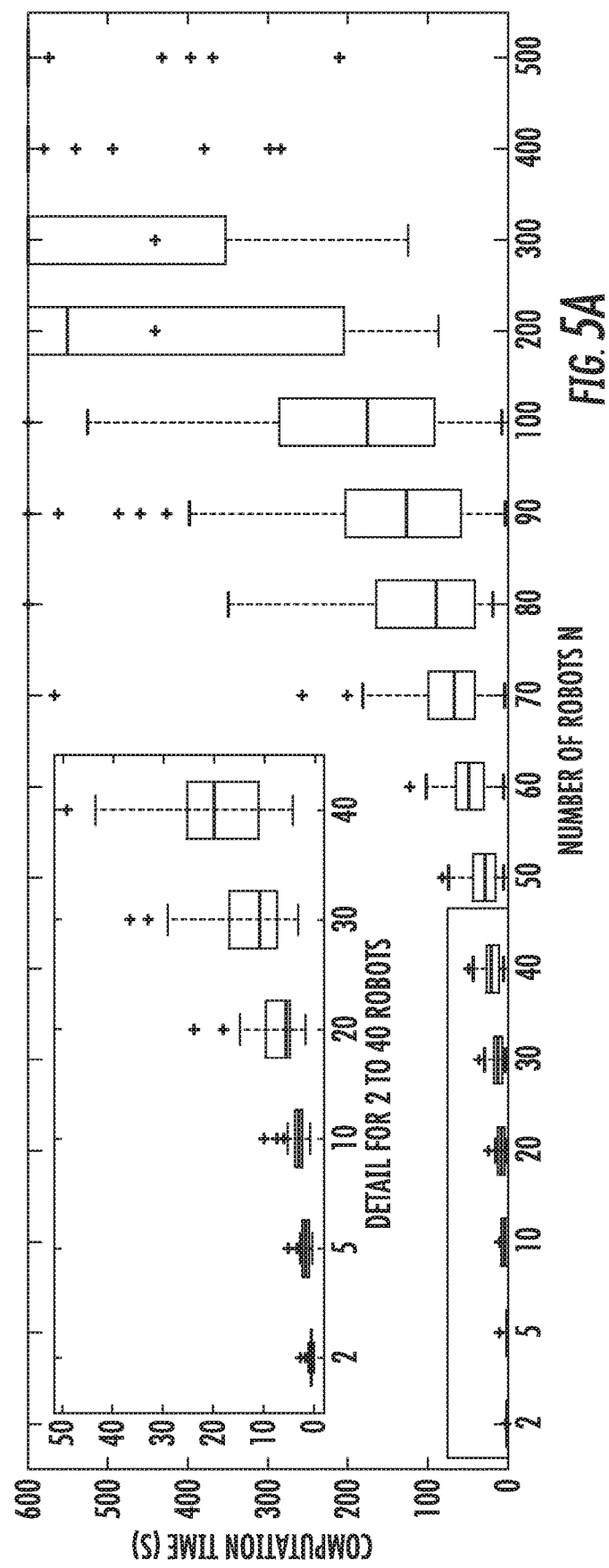
FIG. 5A is a graph illustrating the performance of systems and methods according to embodiments of the presently disclosed subject matter over 50 randomly generated case studies.
Figure 5B:
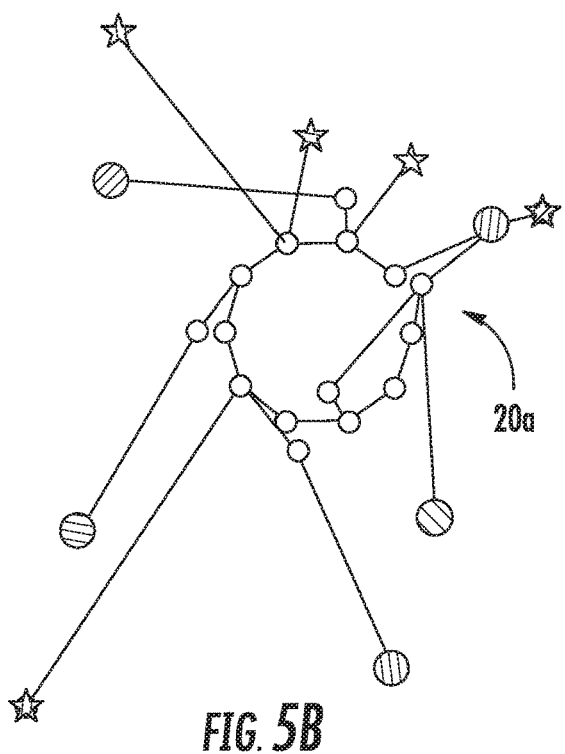
FIGS. 5B through 5D are illustrations of final motion plans generated for the example problems identified in FIG. 5A.
Figure 5C:
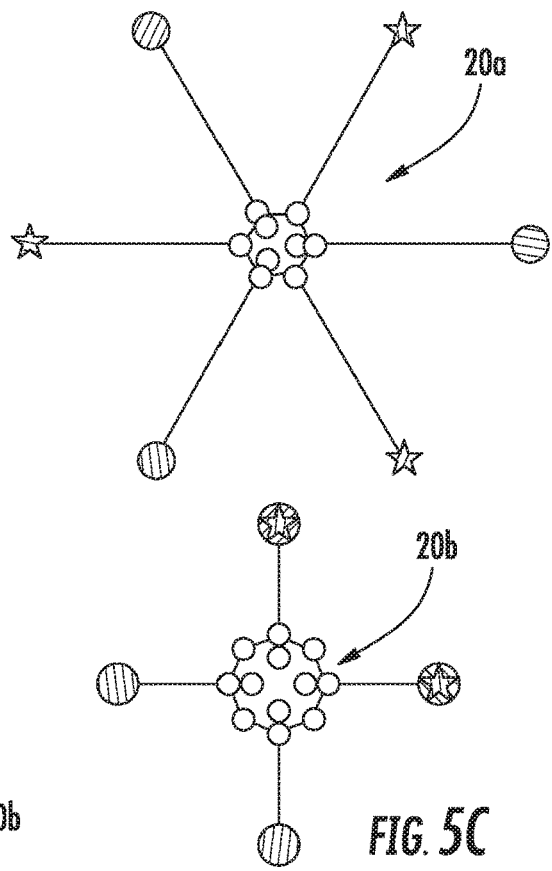
Figure 5D:
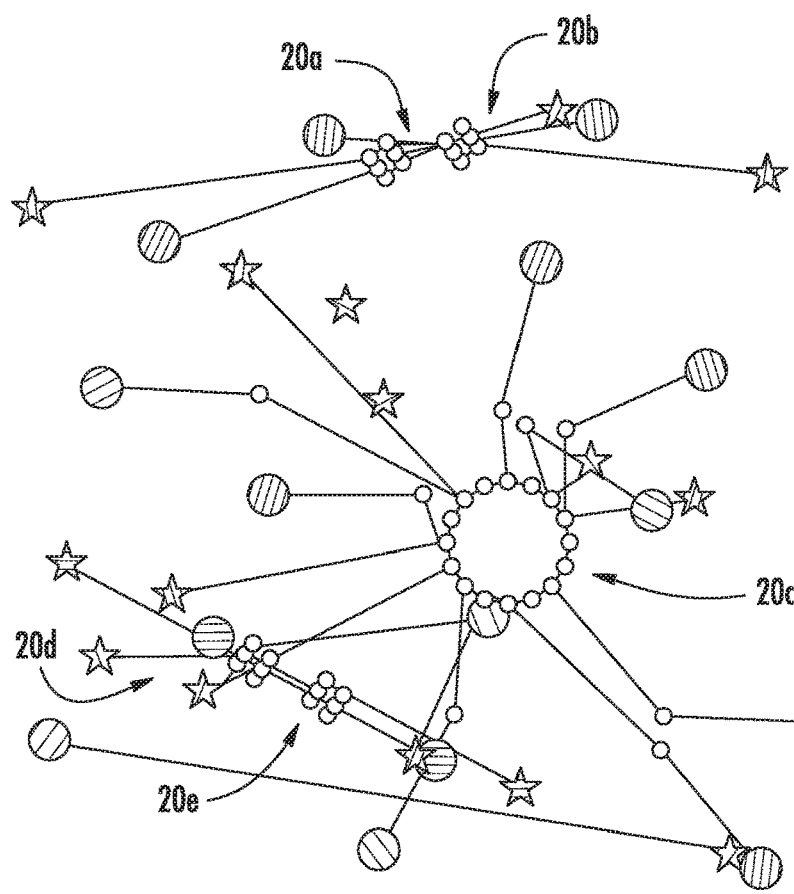
Figure 8:
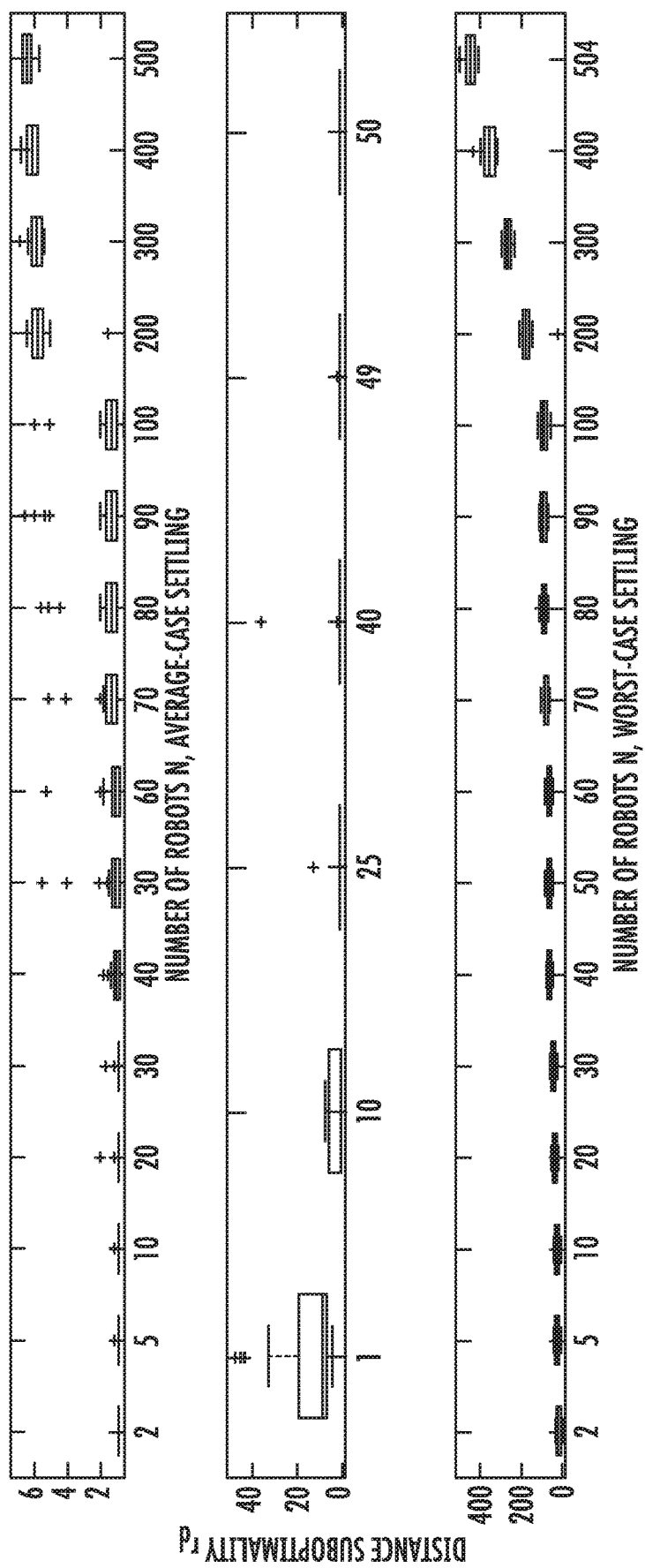
FIG. 8 is a graph illustrating suboptimality over all experiments using systems and methods according to embodiments of the presently disclosed subject matter.

FIG. 5A plots the algorithm computation time for various team sizes. All motion plans for N≤100 were found in less than 4 minutes. FIG. 8 plots the suboptimality ratios of the solutions, $r_d$, which is below 7 for all solved problems. FIGS. 5B-5D show the paths of the final motion plan for three example problems, one with 5 robots engaged in one CHOP 20a (FIG. 5B), one with 7 robots engaged in two CHOPs 20a and 20b (FIG. 5C), and one with 15 robots engaged in five CHOPs 20a, 20b, 20c, 20d, and 20e (FIG. 5D).

4.2 Variations in Problem Density

Next, for a given team size N, a set of start positions was deterministically generated from Halton sequences. These positions are sorted by y-coordinate and stored in $S_{init}$. For each experiment, a constant $D_k$ was chosen and the sets $S = D_k S_{init}$ and $G = S + [2R\ 0]^T$ constructed. Robot $i \in \mathcal{I}_N$ is assigned start position $s_i = S_i$ and goal $$g_i = G_{\phi_i^{D_k}} \cdot \phi_i^{D_k} = i \text{ for } i \leq \left\lceil \frac{D_k}{D_{k,max}} N \right\rceil,$$

and $\phi_i^{D_k}$ for other robots are a random permutation of each other's indices. We designate $D_{k,max}$=50. When $D_k = D_{k,max}$, $\phi_i^{D_k} = i$ for all robots, representing the best-case scenario: robots are sparsely located and their OMPs, a simple translation rightwards, are safe. As $D_k$ decreases, the available free space decreases and the number of collisions increases.

Figure 6:
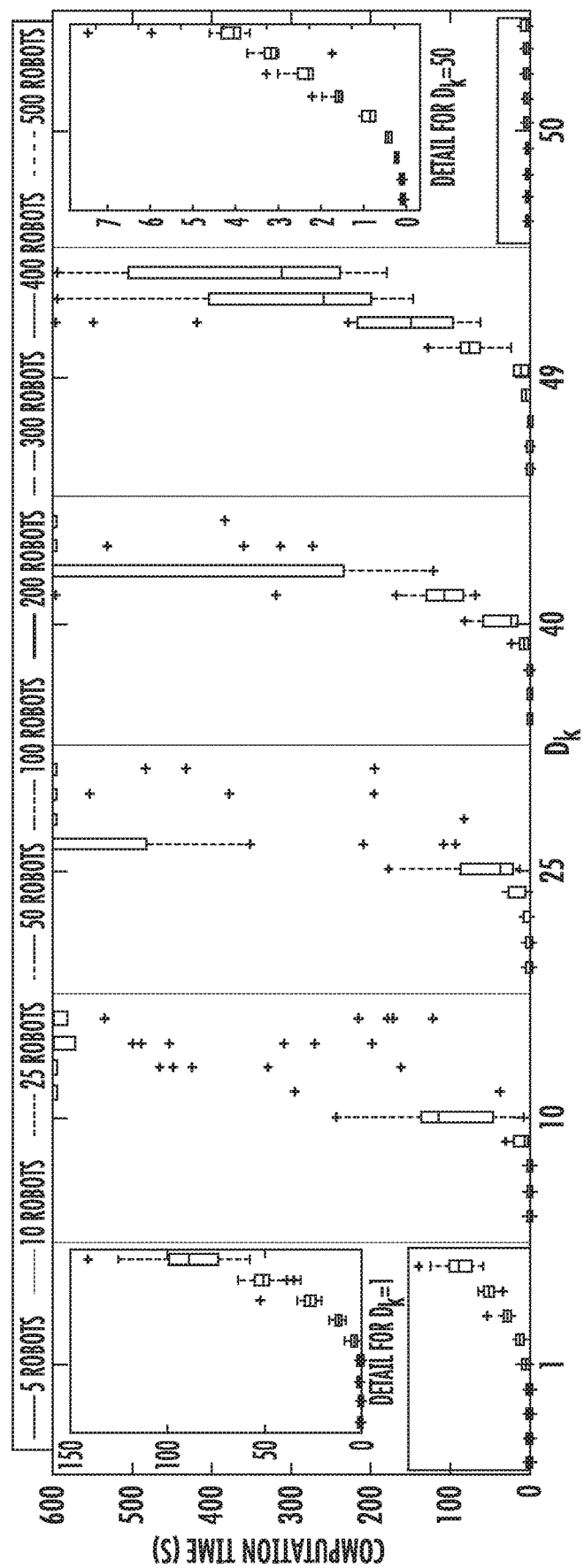
FIG. 6 is a graph illustrating computation time over 25 trials for each combination of vehicle number and vehicle density using systems and methods according to embodiments of the presently disclosed subject matter.

FIG. 6 shows the computation time and FIG. 8 shows the corresponding $r_d$ values over 25 trials for each combination of N and $D_k$. For small $D_k$, robots are tightly packed and a single large CHOP will likely be created in a few iterations. Solutions are found quickly, but $r_d$ values are high. As $D_k$ increases, the available free space allows for formation of more local CHOPs, causing smaller deviations from robots'

OMPs. This decreases $r_d$, but increases the computation time. This increase in computation time is more dramatic for larger values of N.

For large $D_k$, collisions become sparse and fewer CHOPs need to be constructed, decreasing both the computation time and $r_d$. When $D_k=D_{max}$, no CHOPs need to be created, so the computation time required is small. In short, the present systems and methods find solutions quickly for both extremely sparse and dense settings, but they require more computation time when planning many local CHOPs for large teams.

4.3 Worst-Case Distributions

The algorithm's performance in the worst-case scenario has also been evaluated. For a given N, the densest packing of N equally-sized circles may be found in a square that satisfies the separation conditions [12]. These circles' centers may be used as both the start and goal positions, and 50 random assignments were generated for each N. These problems pose the additional challenge that each robot's goal is the start position of another robot.

Figure 7:
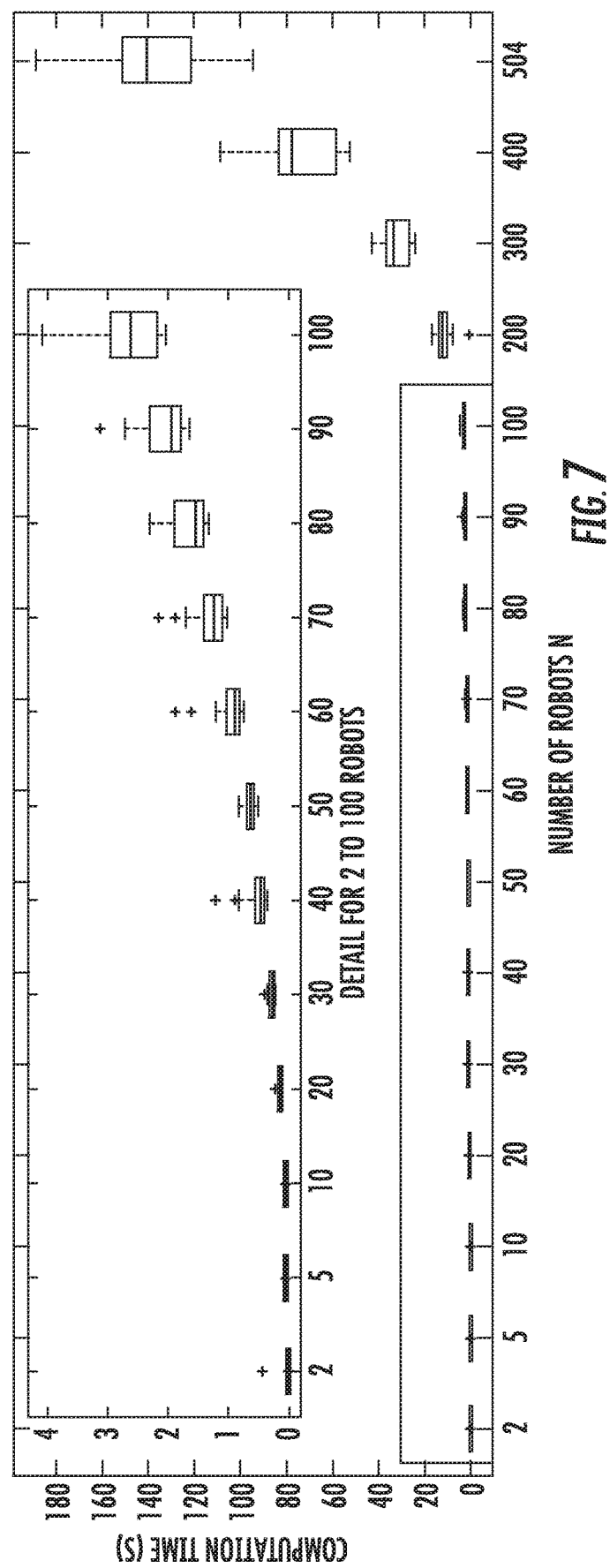
FIG. 7 is a graph illustrating computation time in worst-case settings over 50 trials for each team size using systems and methods according to embodiments of the presently disclosed subject matter.

FIG. 7 shows that the present systems and methods can efficiently solve these problems for N≤504 in less than 3.5 minutes. Again, once the first collision is found, it is probable that a CHOP containing all N robots will be formed in only a few iterations. Referring again to FIG. 8, $r_d$ becomes rather high for large teams. Nonetheless, the present systems and methods are able to find safe motion plans for teams of hundreds of robots in a challenging environment.

4.4 Comparison with Other Multi-Robot Planning Algorithms

Finally, the performance of our algorithm is analyzed in comparison with M* with heuristic function inflated by ε [18] and Optimal Reciprocal Collision Avoidance (ORCA) [16]. Table 1 reports the algorithms' performances for a problem generated in Section 3.2 with N=10, $D_k$=1, 5, and 10.

The M* algorithm builds on A* as an underlying algorithm, searching for optimal paths to goals for each robot in its individual configuration space when robots are collision-free and in a higher-dimensional joint configuration space when they collide. M* retains the completeness and optimality guarantees of A*. In the best-case scenario, M* is extremely fast, as its search space remains low-dimensional. However, its computation time scales up quickly as robots become more densely packed, as the size of the search space grows exponentially with each additional robot in collision. The computation time of the present systems and methods does not scale up as quickly. It is noted that variants of M* can improve performance, but no results for M*-based algorithms have been reported for problems where N>200 [18].

ORCA is a decentralized, real-time algorithm that, at each time step, assigns each robot a safe velocity based on the observed velocities of its neighbors. The assigned velocity is guaranteed to be collision-free for a known time horizon. The total time of the motion plan is reported as the algorithm's planning time, but it is noted that these are different measures. Compared to the present systems and methods, ORCA's solutions are more optimal. However, in highly dense scenarios, it is possible that a guaranteed safe velocity cannot be found and robots are forced to choose a "best possible" velocity instead. While ORCA has been shown to perform well for large teams in dense settings in practice [16], there are no safety or completeness guarantees.

TABLE 1

Comparison of performances of multi-robot planning algorithms

|  |  | OMP + CHOP | M* (ε = 1:5) | ORCA [15] |
|---|---|---|---|---|
| Best case | Planning Time (s) | 2.78 | 0.0020 | 6.00 |
| $D_k$ = 10 | Suboptimality Ratio | 1.00 | 1.00 | 1.00 |
| Average Case | Planning Time (s) | 2.59 | 0.027 | 70.25 |
| $D_k$ = 5 | Suboptimality Ratio | 1.07 | 1.001 | 1.001 |
| Worst Case | Planning Time (s) | 2.65 | 16.09 | 23.00 |
| $D_k$ = 1 | Suboptimality Ratio | 5.35 | 1.11 | 1.07 |

5 CONCLUSIONS AND FUTURE WORK

The present systems and methods are presented to solve the labeled multi-robot planning problem. This algorithm is scalable while still maintaining safety and completeness guarantees. CHOPs are designed analytically, and no high-dimensional graph searches are required to resolve imminent collisions between robots. This becomes particularly beneficial in densely packed regions or when many robots converge at a single collision point, where other motion planning algorithms reach bottlenecks.

However, in some embodiments, there may be trade off between optimality for safety and scalability. In particular, in densely packed problems, the motion plan can be considered suboptimal and some robots might circle the CHOP many times before exiting. In this regard, the presently disclosed subject matter may be extended to applying the algorithm to robots with higher order dynamics and developing a decentralized algorithm requiring only local communication. Future work will also work towards analytically characterizing the algorithm's suboptimality.

Furthermore, although much of the discussion presented above assumes operation of all of the vehicles within a single horizontal plane, the subject matter disclosed herein may be extended to systems and methods of operating a plurality of vehicles over a range of altitudes (e.g., to the extent possible within the bounds of federal aviation restrictions). In some embodiments, for example, even with robots flying at different altitudes, the present systems and methods may be implemented amongst a subset of the vehicles at the same altitude to resolve collisions between them. Alternatively or in addition, in some embodiments, robots flying at different altitudes can be configured to still execute a single holding pattern. In some embodiments, for example, such an implementation may help prevent downwash of vehicles that are flying above one another.

In some aspects, the present systems and methods are similar to the holding patterns currently used in civilian aviation in congested airspace. In commercial aviation, aircraft are monitored and directed by air traffic controllers to follow trajectories that will avoid collisions. In crowded areas around airports, aircraft are frequently directed to enter holding patterns while they wait for their turn to land. However, the success of such methods depends on a human operator to coordinate vehicles. In contrast, the present systems and methods allow for autonomous coordination of vehicles. Thus, the present systems and methods may be used to coordinate a fleet of drones, such as for package-delivery.

In addition, this algorithm is complete—meaning that it will always generate a collision-free solution if one exists. Prior work in this area scales poorly—it becomes very computationally intense as the number of robots increases. In contrast, the systems and methods disclosed herein scale well for teams of up to 100 robots or more. In this work, robots are directed by a ground station, although further optimization could distribute dynamic computations to the robots themselves.

The present subject matter may be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter. In particular, for example, although references are made to the present systems and methods being applied to unmanned aircraft systems, the principles discussed herein may be applied to any coordinated, substantially-planar motion of vehicles, including by not limited to micro aerial vehicles, ground vehicles, surface ships, and submersibles. In addition, the presently-disclosed systems and methods may be equally applied to both robotic and human-piloted vehicles.

The disclosure of each of the following references is incorporated herein by reference in its entirety.

REFERENCES

1. Buckley S., "Fast motion planning for multiple moving robots," in Proceedings of the 1989 IEEE International Conference on Robotics and Automation (ICRA), 1989, pp. 322-326.
2. de Wilde B., ter Mors A. W., and Witteveen C., "Push and rotate: Cooperative multi-agent path planning," in Proceedings of the 2013 International Conference on Autonomous Agents and Multi-agent Systems (AAMAS), 2013, pp. 87-94.
3. Erdmann M. and Lozano-Perez T., "On multiple moving objects," Algorithmica, vol. 2, pp. 1419-1424,1986.
4. FAA, "Overview of small uas notice of proposed rulemaking," February 2015.
5. Forbes, "Meet amazon prime air, a delivery-by-aerial-drone project," December 2013.
6. Goldenberg M., Felner A., Stern R., Sharon G., Sturtevant N., Holte R. C., and Schaeffer J., "Enhanced partial expansion A*," Journal of Artificial Intelligence Research, vol. 50, no. 1, pp. 141-187,2014.
7. Hart P. E., Nilsson N. J., and Raphael B., "A formal basis for the heuristic determination of minimum cost paths," IEEE Transactions on Systems Science and Cybernetics, vol. 4, no. 2, pp. 100-107, July 1968.
8. Hastings E. J., Mesit J., and Guha R. K., "Optimization of large-scale, real-time simulations by spatial hashing," in Proceedings of the 2005 Summer Computer Simulation Conference, 2005, pp. 9-17.
9. Kant K. and Zucker S. W., "Toward efficient trajectory planning: The path-velocity decomposition," The International Journal of Robotics Research (IJRR), vol. 5, no. 3, pp. 72-89,1986.
10. Kuhn H., "The hungarian method for the assignment problem," Naval Research Logistics Quarterly, vol. 2, no. 1-2, pp. 83-97,1955.
11. Peng J. and Akella S., "Coordinating multiple robots with kinodynamic constraints along specified paths," The International Journal of Robotics Research (IJRR), vol. 24, no. 4, pp. 295-310,2005.
12. Specht E., "The best known packings of equal circles in a square," October 2013. [Online]. Available: http://hydra.nat.uni-magdeburg.de/packing/csq/csq.htm I
13. Tomlin C., Pappas G. J., and Sastry S., "Conflict resolution for air traffic management: a study in multi-agent hybrid systems," IEEE Transactions on Automatic Control, vol. 43, pp. 509-521,1998.
14. Turpin M., Michael N., and Kumar V., "CAPT: Concurrent assignment and planning of trajectories for multiple robots," The International Journal of Robotics Research, vol. 33, no. 1, pp. 98-112,2014.
15. van den Berg J., "RVO2 library documentation," 2008. [Online]. Available: http://gamma.cs.unc.edu/RVO2/documentation/2.0/index.html
16. van den Berg J., Guy S. J., Lin M. C., and Manocha D., "Reciprocal n-body collision avoidance," in The 14th International Symposium on Robotics Research (ISRR), 2009, pp. 3-19.
17. van den Berg J., Snoeyink J., Lin M., and Manocha D., "Centralized path planning for multiple robots: Optimal decoupling into sequential plans," in Proceedings of Robotics: Science and Systems (RSS), 2009.
18. Wagner G. and Choset H., "Subdimensional expansion for multirobot path planning," Artificial Intelligence, vol. 219, pp. 1-24,2015.
19. Yu J. and LaValle S. M., "Planning optimal paths for multiple robots on graphs," in Proceedings of 2014 IEEE International Conference on Robotics and Automation (ICRA), 2013, pp. 3612-3617.

What is claimed is:

1. A method for generating trajectories for a plurality of vehicles in a multi-vehicle system, the method comprising:
determining optimal motion plans for moving each of the plurality of vehicles between a respective starting position and an assigned goal position;
identifying possible collisions of the plurality of vehicles among the optimal motion plans; and
for a subset of the plurality of vehicles identified as being associated with a one of the possible collisions, modifying respective ones of the optimal motion plans of each of the plurality of vehicles in the subset to define modified trajectories,
wherein each of the modified trajectories includes a common holding pattern such that the one of the possible collisions is avoided; and
wherein one or more of the steps of determining optimal motion plane, identifying possible collisions, or modifying respective ones of the optimal motion plans is performed by a processor of a computer.

2. The method of claim 1, wherein the optimal motion plans for the plurality of vehicles each comprises a constant-velocity straight-line path.

3. The method of claim 1, wherein modifying the respective ones of the optimal motion plans of each of the plurality of vehicles in the subset to include a common holding pattern comprises defining a center of a circular holding pattern according to the relationship:

$$x_c = \frac{\sum_{i \in \mathcal{J}_{N_m}} X_{s,i}}{N_m},$$

where $x_c$ is the position of the center of the circular holding pattern, $N_m$ is a number of vehicles in the circular holding pattern, $\mathcal{J}_{N_m}$ is the set representing the vehicles in the circular holding pattern, and $X_{s,i}$ is the starting position of a vehicle i in the set $\mathcal{J}_{N_m}$.

4. The method of claim 1, wherein modifying the respective ones of the optimal motion plans of each of the plurality of vehicles in the subset to include a common holding pattern comprises designating a set of intermediate waypoints in the holding pattern.

5. The method of claim 4, wherein modifying the respective ones of the optimal motion plans of each of the plurality of vehicles in the subset to define modified trajectories comprises assigning an entry waypoint from among the intermediate waypoints for each of the plurality of vehicles in the subset.

6. The method of claim 5, wherein a different entry waypoint is designated for each of the plurality of vehicles in the subset.

7. The method of claim 4, wherein the intermediate waypoints are arranged at a distance from each other that is equal to or greater than $2\sqrt{2}$ R, wherein R is an equivalent radius of each of the plurality of vehicles.

8. The method of claim 4, wherein the intermediate waypoints are arranged at a distance from each assigned goal position of the plurality of vehicles that is equal to or greater than $2\sqrt{2}$ R, wherein R is an equivalent radius of each of the plurality of vehicles.

9. The method of claim 4, wherein the intermediate waypoints are arranged such that every path between a pair of consecutive intermediate waypoints is a distance from each assigned goal position of the plurality of vehicles that is equal to or greater than $2\sqrt{2}$ R, wherein R is an equivalent radius of each of the plurality of vehicles.

10. The method of claim 4, wherein modifying the respective ones of the optimal motion plans of each of the plurality of vehicles in the subset to define modified trajectories comprises assigning an exit waypoint from among the intermediate waypoints for each of the plurality of vehicles in the subset.

11. The method of claim 10, further comprising assigning priorities to each of the plurality of vehicles in the subset, wherein a one of the plurality of vehicles in the subset is permitted to exit the holding pattern only after other of the plurality of vehicles in the subset having higher priorities have exited.

12. The method of claim 1, further comprising iteratively repeating the steps of identifying possible collisions and modifying the optimal motion plans to define modified trajectories that each include one or more additional common holding pattern.

13. The method of claim 12, wherein iteratively repeating the steps of identifying possible collisions and modifying the optimal motion plans to define modified trajectories comprises merging two or more circular holding patterns that will cause conflicting motion plans.

14. The method of claim 1 wherein the plurality of vehicles comprises flying vehicles.

15. The method of claim 1 wherein the plurality of vehicles comprises land or water vehicles.

16. A system for generating trajectories in a multi-vehicle system comprising:
a plurality of vehicles; and
a controller configured for determining optimal motion plans for moving each of the plurality of vehicles between a respective starting position and an assigned goal position, identifying possible collisions of the plurality of vehicles among the optimal motion plans, and, for a subset of the plurality of vehicles identified as being associated with a one of the possible collisions, modifying respective ones of the optimal motion plans of each of the plurality of vehicles in the subset to define modified trajectories;
wherein each of the modified trajectories includes a common circular holding pattern such that the one of the possible collisions is avoided.

17. The system of claim 16, comprising a transmitting device in communication with the controller and with each of the plurality of vehicles, the transmitting device being configured to transmit the modified trajectories to the plurality of vehicles.

18. The system of claim 16, wherein the controller is integrated with each of the plurality of vehicles.

19. The system of claim 16, wherein the plurality of vehicles comprises a plurality of flying vehicles.

20. The system of claim 16, wherein the plurality of vehicles comprises a plurality of land or water vehicles.

21. A non-transitory computer readable medium having stored thereon executable instructions that when executed by the processor of a computer control the computer to perform steps comprising:
determining optimal motion plans for moving each of a plurality of vehicles in a multi-vehicle system between a respective starting position and an assigned goal position;
identifying possible collisions of the plurality of vehicles among the optimal motion plans; and
for a subset of the plurality of vehicles identified as being associated with a one of the possible collisions, modifying respective ones of the optimal motion plans of each of the plurality of vehicles in the subset to define modified trajectories;
wherein each of the modified trajectories includes a common circular holding pattern such that the one of the possible collisions is avoided.

* * * * *